US012342116B2

(12) United States Patent
Kim et al.

(10) Patent No.: US 12,342,116 B2
(45) Date of Patent: Jun. 24, 2025

(54) APPARATUS

(71) Applicant: LG Display Co., Ltd., Seoul (KR)

(72) Inventors: Yongjoon Kim, Gyeonggi-do (KR); Jaewon Hwang, Gyeonggi-do (KR); Joongsup Han, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 309 days.

(21) Appl. No.: 17/984,693

(22) Filed: Nov. 10, 2022

(65) Prior Publication Data

US 2023/0199354 A1 Jun. 22, 2023

(30) Foreign Application Priority Data

Dec. 21, 2021 (KR) ........................ 10-2021-0184066

(51) Int. Cl.
*H04R 1/02* (2006.01)
*H04R 1/28* (2006.01)
*H04R 17/00* (2006.01)

(52) U.S. Cl.
CPC ........... *H04R 1/025* (2013.01); *H04R 1/2857* (2013.01); *H04R 17/00* (2013.01); *H04R 2499/15* (2013.01)

(58) Field of Classification Search
CPC ...... H04R 17/00; H04R 1/025; H04R 1/2857; H04R 2499/15
See application file for complete search history.

(56) References Cited

U.S. PATENT DOCUMENTS

2016/0190428 A1* 6/2016 Lim ..................... H05K 5/0017 310/317
2019/0028669 A1* 1/2019 Shin ..................... H10K 50/841
2019/0129231 A1* 5/2019 Ham ...................... H04R 7/045

* cited by examiner

*Primary Examiner* — Sunita Joshi
(74) *Attorney, Agent, or Firm* — Birch, Stewart, Kolasch & Birch, LLP

(57) ABSTRACT

An apparatus includes a vibration member, a vibration apparatus disposed on a rear surface of the vibration member to vibrate the vibration member, a supporting member on a rear surface of the vibration apparatus, the supporting member including a first surface facing the vibration member and a second surface opposite to the first surface, a vibration signal cable disposed on the first surface or the second surface of the supporting member, and a conductive connection member electrically connecting the vibration apparatus to the vibration signal cable.

22 Claims, 13 Drawing Sheets

APPARATUS

CROSS-REFERENCE TO RELATED APPLICATIONS

This application claims priority to Korean Patent Application No. 10-2021-0184066 filed on Dec. 21, 2021 in the Republic of Korea, the entire contents of which are hereby expressly incorporated by reference into the present application.

BACKGROUND

Technical Field

The present disclosure relates to an apparatus, and more particularly, to an apparatus in which a connection structure between a vibration apparatus and an audio controller is simplified.

Discussion of the Related Art

Apparatuses include a separate speaker or sound apparatus, for providing a sound. When a speaker is provided in (e.g., within) an apparatus, a problem occurs (e.g., a problem can occur) where the design and space arrangement of the apparatus are limited due to a space occupied by the speaker. That is, the speaker can cause the apparatus to be too large and can limit the options for designing the apparatus.

A speaker applied to apparatuses cancan be, for example, an actuator including a magnet and a coil, e.g., as known in the art. However, when an actuator is applied to an apparatus, there is a drawback where a thickness is thick (e.g., the apparatus becomes too thick). Piezoelectric devices for implementing a thin thickness (e.g., for the apparatus) are attracting much attention.

Due to a fragile characteristic, piezoelectric devices are easily damaged due to an external impact, causing a problem where the reliability of sound reproduction is low. Also, when a speaker such as a piezoelectric device is applied to a flexible apparatus, there is a problem where damage occurs due to a fragile characteristic.

Moreover, due to a vibration signal cable unload hole (e.g., for receiving a sound input means) of a piezoelectric device, stiffness and heat dissipation quality are reduced, a position of a piezoelectric device is limited, and heat occurs due to a vibration signal cable in driving a piezoelectric device.

Information disclosed in this Background section was already known to the inventors of the inventive concept before achieving the present disclosure or is technical information acquired in the process of achieving the present disclosure. Therefore, it can contain information that does not form the prior art that is already known to the public in this country.

SUMMARY OF THE DISCLOSURE

Accordingly, the inventors have recognized problems and other limitations described above and associated with the related art, and have performed various experiments for implementing a vibration apparatus which can enhance the quality of a sound and can enhance a sound pressure level characteristic of the vibration apparatus. Through the various experiments, the inventors have invented a new vibration apparatus and an apparatus including the same, which can enhance the quality of a sound and can enhance a sound pressure level characteristic of the vibration apparatus.

An aspect of the present disclosure is directed to providing a vibration apparatus, an apparatus including the same, and a vehicular apparatus including the vibration apparatus, which can vibrate a vibration object (e.g., a vibration member) to generate a vibration or sound and can enhance a sound characteristic and/or a sound pressure level characteristic of the vibration apparatus.

Another aspect of the present disclosure is directed to providing a vibration apparatus having a simplified structure and an apparatus including the same.

Additional advantages and aspects of the disclosure will be set forth in part in the description that follows and in part will be apparent from the description or can be learned by practice of the inventive concepts provided herein. Other features and aspects of the inventive concepts can be realized and attained by the structure particularly pointed out in the written description, or derivable therefrom, and claims hereof as well as the appended drawings.

To achieve these and other advantages and in accordance with the purpose of the disclosure, as embodied and broadly described herein, there is provided an apparatus including a vibration member, a vibration apparatus disposed on a rear surface of the vibration member to vibrate the vibration member, a supporting member on a rear surface of the vibration apparatus, the supporting member including a first surface facing the vibration member and a second surface opposite to the first surface, a vibration signal cable disposed on the first surface or the second surface of the supporting member, and a conductive connection member electrically connecting the vibration apparatus to the vibration signal cable.

In another aspect of the present disclosure, there is provided an apparatus including a vibration member, a vibration apparatus disposed on a rear surface of the vibration member to vibrate the vibration member, a supporting member on a rear surface of the vibration apparatus, the supporting member including a first surface facing the vibration member and a second surface opposite to the first surface, and a vibration signal cable disposed on the first surface and the second surface of the supporting member, wherein the vibration apparatus further includes a signal cable receiving a positive signal and a negative signal and a fixing member fixing the signal cable to the vibration signal cable.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain the principle of the disclosure.

Figure 1:
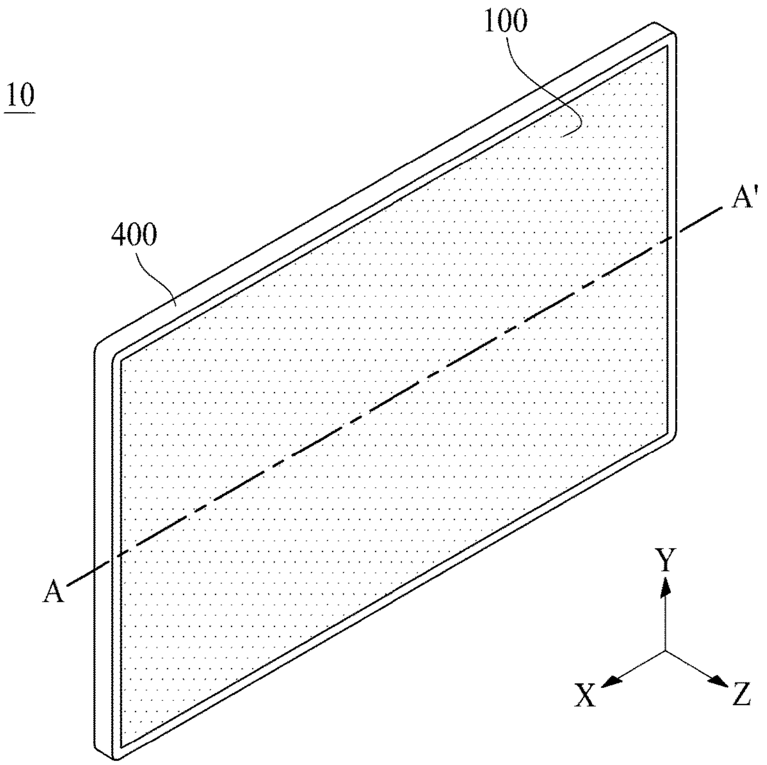
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations can unnecessarily obscure aspects of the present disclosure, the detailed description thereof can be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout the specification. In the following description, when the detailed description of the relevant known function or configuration is determined to unnecessarily obscure the important point of the present disclosure, the detailed description will be omitted.

When the terms "comprise," "have," and "include," "contain," "constitute," "make up of," "formed of," and the like are used, one or more other elements can be added unless the term, such as "only" is used. The terms of a singular form can include plural forms unless the context clearly indicates otherwise.

In construing an element, the element is construed as including an error range even where no explicit description is provided.

In describing a position relationship, for example, when the position relationship is described using "on," "over," "under," "above," "below," "beneath," "near," "close to," or "adjacent to," "beside," "next to," or the like, one or more portions can be arranged between two other portions unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a temporal relationship, for example, when the temporal order is described as "after," "subsequent," "next," "before," "prior to," or the like, a case which is not continuous can be included unless a more limiting term, such as "just," "immediate(ly)," or "direct(ly)" is used.

It will be understood that, although the terms "first," "second," "A," "B," "(a)," "(b)," or the like can be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and can be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Figure 2:
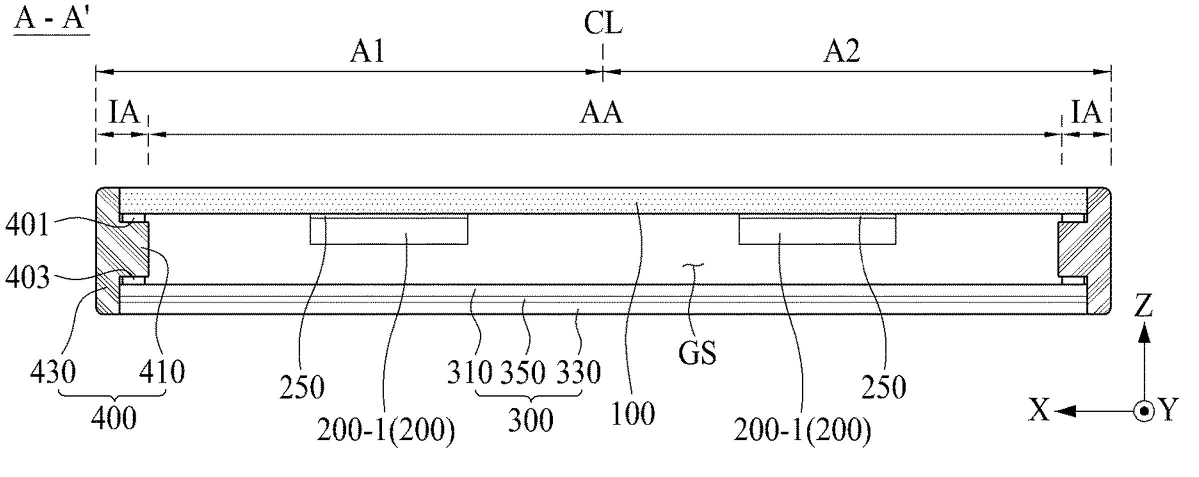
FIG. 2 is a cross-sectional view taken along line A-A' of FIG. 1.

FIG. 1 illustrates an apparatus according to an embodiment of the present disclosure, and FIG. 2 is a cross-sectional view taken along line A-A' of FIG. 1.

With reference to FIGS. 1 and 2, the apparatus 10 (e.g., speaker, piezoelectric speaker, piezo bender, electroacoustic transducer, etc.) according to an embodiment of the present disclosure can include a vibration member 100 and a vibration apparatus 200 which is disposed on a rear surface (e.g., a backside surface) of the vibration member 100.

For example, the vibration member 100 can output a sound on the basis of a vibration of the vibration apparatus 200. The vibration apparatus 200 can output a sound by using the vibration member 100 as a vibration plate. For example, the vibration apparatus 200 can output a sound toward a front surface of the vibration member 100 by using the vibration member 100 as a vibration plate. For example, the vibration apparatus 200 can generate a sound so that the sound travels toward the front surface of the vibration member 100 or towards the front surface of the display panel. The vibration apparatus 200 can vibrate the vibration member 100 to output a sound. For example, the vibration apparatus 200 can directly vibrate the vibration member 100 to output a sound. For example, the vibration member 100 can be a vibration object, a display panel, a vibration plate, or a front member, but embodiments of the present disclosure are not limited thereto. Hereinafter, an embodiment where a vibration member is a display panel will be described.

The vibration member (e.g., display panel) 100 can display an image (for example, an electronic image, a digital image, a still image, or a video image). For example, the vibration member 100 can emit light to display an image. The display panel can be a curved display panel or a flat display panel or all types (e.g., any type) of display panels such as a liquid crystal display panel, an organic light emitting display panel, a quantum dot light emitting display panel, a micro light emitting diode display panel, and an electrophoresis display panel. For example, the vibration member 100 can be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto.

The vibration member 100 according to an embodiment of the present disclosure can include a display area active area AA (see FIG. 2) which displays an image on the basis of driving of a plurality of pixels. The vibration member 100 can include a non-display area inactive area IA (see FIG. 2) which surrounds the display area AA, but embodiments of the present disclosure are not limited thereto.

The vibration member 100 according to an embodiment of the present disclosure can include an anode electrode, a cathode electrode, and a light emitting device and can display an image in a type such as a top emission type, a bottom emission type, or a dual emission type, on the basis of a structure of a pixel array layer including a plurality of pixels. In the top emission type, visible light emitted from the pixel array layer can be irradiated in a forward direction of a base substrate to allow an image to be displayed, and in the bottom emission type, the visible light emitted from the pixel array layer can be irradiated in a rearward direction of the base substrate to allow an image to be displayed.

The vibration member 100 according to an embodiment of the present disclosure can include a pixel array portion disposed on a substrate. The pixel array portion can include a plurality of pixels which display an image on the basis of a signal supplied through each of signal lines. The signal lines can include a gate line, a data line, and a pixel driving power line, but embodiments of the present disclosure are not limited thereto.

Each of the plurality of pixels can include a pixel circuit layer including a driving TFT provided in a pixel area which is configured by a plurality of gate lines and/or a plurality of data lines, an anode electrode electrically connected to the driving TFT, a light emitting device formed on the anode electrode, and a cathode electrode electrically connected to the light emitting device.

The driving TFT can be provided in a transistor region of each pixel area provided in a substrate. The driving TFT can include a gate electrode, a gate insulation layer, a semiconductor layer, a source electrode, and a drain electrode. The semiconductor layer of the driving TFT can include silicon, such as amorphous silicon (a-Si), polysilicon (poly-Si), or low temperature poly-Si or can include oxide such as indium-gallium-zinc-oxide (IGZO), but embodiments of the present disclosure are not limited thereto.

The anode electrode (e.g., a pixel electrode) can be provided in an opening region provided in each pixel area and can be electrically connected to the driving TFT.

The light emitting device according to an embodiment of the present disclosure can include an organic light emitting device layer provided on the anode electrode. The organic light emitting device layer can be implemented so that pixels emit light of the same color (for example, white light) or emit lights of different colors (for example, red light, green light, and blue light). The cathode electrode (e.g., a common electrode) can be connected to the organic light emitting device layer provided in each pixel area. For example, the organic light emitting device layer can have a stack structure including two or more structures or a single structure including the same color. In another embodiment of the present disclosure, the organic light emitting device layer can have a stack structure including two or more structures including one or more different colors for each pixel. Two or more structures including one or more different colors can be configured in one or more of blue, red, yellow-green, and green, or a combination thereof, but embodiments of the present disclosure are not limited thereto. An example of the combination can include blue and red, red and yellow-green, red and green, and red/yellow-green/green, but embodiments of the present disclosure are not limited thereto. Also, regardless of a stack order thereof, the combination can be applied. A stack structure (a structure having multiple layers that are stacked on one another) including two or more structures having the same color or one or more different colors can further include a charge generating layer between two or more structures. The charge generating layer can have a PN junction structure and can include an N-type charge generating layer and a P-type charge generating layer.

According to another embodiment of the present disclosure, the light emitting device can include a micro light emitting diode device which is electrically connected to each of the anode electrode and the cathode electrode. The micro light emitting diode device can be a light emitting diode implemented as an integrated circuit (IC) type or a chip type. The micro light emitting diode device can include a first terminal electrically connected to the anode electrode and a second terminal electrically connected to the cathode electrode. The cathode electrode can be connected to the second terminal of the micro light emitting diode device provided in each pixel area.

An encapsulation portion can be formed on the substrate to surround the pixel array portion, and thus, can prevent oxygen or water from penetrating into the light emitting device layer of the pixel array portion. The encapsulation portion according to an embodiment of the present disclosure can be formed in a multi-layer structure where an organic material layer and an inorganic material layer are alternately stacked, but embodiments of the present disclosure are not limited thereto. The inorganic material layer can prevent oxygen or water from penetrating into the light emitting device layer of the pixel array portion. The organic material layer can be formed to have a thickness which is relatively thicker than that of the inorganic material layer, so as to cover particles occurring in a manufacturing process. For example, the encapsulation portion can include a first inorganic layer, an organic layer on the first inorganic layer, and a second inorganic layer on the organic layer. The organic layer can be a particle covering layer, but the terms are not limited thereto. A touch panel can be disposed on the encapsulation portion, or can be disposed on a rear surface of the pixel array portion or in the pixel array portion. However, the location of the touch panel is not limited thereto.

The vibration member 100 according to an embodiment of the present disclosure can include a first substrate, a second substrate, and a liquid crystal layer. The first substrate can be an upper substrate or a TFT array substrate. For example, the first substrate can include a pixel array (e.g., a display portion or a display area) including a plurality of pixels provided in a pixel area configured by the plurality of gate lines and/or the plurality of data lines. Each of the plurality of pixels can include a TFT connected to a gate line and/or a data line, a pixel electrode connected to the TFT, and a common electrode which is formed to be adjacent to the pixel electrode and is supplied with a common voltage.

The first substrate can further include a pad portion provided at a first edge (e.g., a non-display portion) thereof and a gate driving circuit provided at a second edge (e.g., a second non-display portion) thereof.

The pad portion can supply the pixel array portion and/or the gate driving circuit with a signal supplied from the outside. For example, the pad portion can include a plurality of data pads connected to the plurality of data lines through a plurality of data link lines and/or a plurality of gate input pads connected to the gate driving circuit through a gate control signal line. For example, a size of the first substrate can be greater than that of the second substrate, but the terms are not limited thereto.

The gate driving circuit can be embedded (e.g., integrated) into the second edge of the first substrate so as to be connected to the plurality of gate lines. For example, the gate driving circuit can be implemented with a shift register (e.g., a type of a digital circuit a using a cascade of a flip-flops a where the output of one flip-flop is connected to the input of the next) including a transistor formed by the same process as a TFT provided in the pixel area. According to another embodiment of the present disclosure, the gate driving circuit may not be embedded into the first substrate and can be provided in a panel driving circuit in an IC type.

The second substrate can be a lower substrate or a color filter array substrate. For example, the second substrate can include a pixel pattern (e.g., a pixel definition pattern) capable of including an opening region overlapping the pixel area formed in the first substrate and a color filter layer formed in the opening region. The second substrate can have a size which is less than that of the first substrate, but embodiments of the present disclosure are not limited thereto. The second substrate can overlap the other portion (e.g., another), except the first edge, of the first substrate. The second substrate can be bonded to the other portion, except the first edge, of the first substrate by a sealant (e.g., ultraviolet-curable sealant, an epoxy resin, a silicone-based adhesive, or any type of known sealant) with the liquid crystal layer therebetween.

The liquid crystal layer can be disposed between the first substrate and the second substrate. The liquid crystal layer can include liquid crystal where an alignment direction of liquid crystal molecules is changed based on an electrical field generated by the common voltage and a data voltage applied to the pixel electrode for each pixel.

A second polarization member can be attached on a bottom surface (e.g., a lower surface) of the second substrate and can polarize light which is incident from a backlight and travels to the liquid crystal layer. The first polarization member can be attached on a top surface (e.g., an upper surface) of the first substrate and can polarize light which passes through the first substrate and is discharged to the outside.

The vibration member 100 according to an embodiment of the present disclosure can drive the liquid crystal layer with the electrical field which is generated by the common voltage and the data voltage applied to each pixel, thereby displaying an image on the basis of light passing through the liquid crystal layer.

In the vibration member 100 according to another embodiment of the present disclosure, the first substrate can be a color filter array substrate, and the second substrate can be a TFT array substrate. For example, the vibration member 100 according to another embodiment of the present disclosure can have a form where the vibration member 100 according to an embodiment of the present disclosure is vertically reversed. In this case, a pad portion of the vibration member 100 according to another embodiment of the present disclosure can be covered by a separate mechanism.

The vibration member 100 according to another embodiment of the present disclosure can include a bending portion which is bent or curved to have a certain curvature radius or a curved shape.

The bending portion of the vibration member 100 can be implemented at one or more of one edge portion and the other edge portion of the vibration member 100 parallel to each other. The one edge portion and the other edge portion of the vibration member 100 implementing the bending portion can include only the non-display area IA, or can include an edge portion of the display area AA and the non-display area IA. The vibration member 100 including a bending portion implemented by bending of the non-display area IA can have a one-side bezel bending structure or a both-side (e.g., two sided) bezel bending structure. Also, the vibration member 100 including the edge portion of the display area AA and the bending portion implemented by bending of the non-display area IA can have a one-side active bending structure or a both-side active bending structure.

The vibration apparatus 200 can vibrate the vibration member 100 at the rear surface of the vibration member 100, and thus, can provide a user with a sound and/or a haptic feedback on the basis of a vibration of the vibration member 100. The vibration apparatus 200 can be implemented on a rear surface of the vibration member 100 to directly vibrate the vibration member 100. For example, the vibration apparatus 200 can be a vibration generating apparatus, a displacement apparatus, a sound apparatus, or a sound generating apparatus, but the terms are not limited thereto. The vibration apparatus 200 can be provided in plurality and the plurality of vibration apparatuses can be spaced apart from one another in a width direction (e.g., first direction X) of the vibration member 100, or along the longitudinal direction (e.g., second direction Y) and a vertical direction (e.g., third direction Z), where the vertical direction is perpendicular to the longitudinal direction and to the width direction.

In an embodiment of the present disclosure, the vibration apparatus 200 can vibrate based on a vibration driving signal synchronized with an image displayed by the vibration member 100, thereby vibrating the vibration member 100. According to another embodiment of the present disclosure, the vibration apparatus 200 can vibrate based on a haptic feedback signal (e.g., a tactile feedback signal) synchronized with a user touch applied to a touch panel (e.g., a touch sensor layer) which is disposed on the vibration member 100 or embedded into the vibration member 100, and thus, can vibrate the vibration member 100. Accordingly, the vibration member 100 can vibrate based on a vibration of the vibration apparatus 200 to provide a user (e.g., a viewer) with one or more of a sound and a haptic feedback.

The vibration apparatus 200 can vibrate the display panel or the vibration member 100. For example, the vibration apparatus 200 can be implemented on the rear surface of the vibration member 100 to directly vibrate the display panel or the vibration member 100. For example, the vibration apparatus 200 can vibrate the vibration member 100 at the rear surface of the display panel or the vibration member 100, and thus, can provide a user (e.g., a viewer) with a sound and a haptic feedback on the basis of a vibration of the display panel or the vibration member 100.

The vibration apparatus 200 according to an embodiment of the present disclosure can be implemented as a film type (e.g., be formed of a film layer or a plurality of film layers). Because the vibration apparatus 200 is implemented as a film type, the vibration apparatus 200 can have a thickness which is thinner than the vibration member 100, thereby minimizing an increase in thickness of the apparatus caused by the arrangement of the vibration apparatus 200. That is, the vibration apparatus 200 can be provided within an interior space defined by the vibration member 100, a supporting member 300, and a middle frame 400 (described below) disposed between the vibration member 100 and the supporting member 300. For example, the vibration apparatus 200 can be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses the display panel or the vibration member 100 as a vibration plate or a sound vibration plate, but the terms are not limited thereto.

According to another embodiment of the present disclosure, the vibration apparatus 200 may not be disposed on the rear surface of the vibration member 100 and can be applied to a non-display panel instead of the display panel. For example, the non-display panel can be one or more of wood, plastic, glass, metal, cloth, fiber, rubber, paper, leather, an interior material of a vehicle, an indoor ceiling of a building, and an interior material of an aircraft, but embodiments of the present disclosure are not limited thereto. In this case, the non-display panel can be applied as a vibration plate, and the vibration apparatus 200 can vibrate the non-display panel to output a sound.

For example, an apparatus according to an embodiment of the present disclosure can include a vibration member (e.g., a vibration object) 100 and the vibration apparatus 200 disposed in the vibration member 100. For example, the vibration member 100 can include a display panel including a pixel displaying an image, or can include a non-display panel. For example, the vibration member 100 can include a display panel including a pixel displaying an image, or can be one or more of wood, plastic, ceramic, glass, metal, cloth, fiber, rubber, paper, leather, mirror, an interior material of a vehicle, such as the dashboard, the headliner, the truck, etc., a glass window of a vehicle, an indoor ceiling of a building, a glass window of a building, an interior material of a building, an interior material of an aircraft, and a glass window of an aircraft, but embodiments of the present disclosure are not limited thereto. That is, the vibration member can include any member. For example, the vibration member 100 can include one or more of a display panel including a pixel displaying an image, a screen panel on which an image is to be projected from a display apparatus, a lighting panel, a signage panel, a vehicular interior material (e.g., any interior component of a vehicle), a vehicular glass window, a vehicular exterior material (e.g., any exterior component/panel of a vehicle), a ceiling material of a building, an interior material of a building (e.g., any interior component of a building, a glass window of a building, an interior material of an aircraft, a glass window of an aircraft, and mirror, but embodiments of the present disclosure are not limited thereto. For example, the non-display panel can be a light emitting diode lighting panel (e.g., apparatus), an organic light emitting diode lighting panel (e.g., apparatus), or an inorganic light emitting diode lighting panel (e.g., apparatus), but embodiments of the present disclosure are not limited thereto. For example, the vibration member 100 can include a display panel including a pixel displaying an image, or can be one or more of a light emitting diode lighting panel (e.g., apparatus), an organic light emitting diode lighting panel (e.g., apparatus), or an inorganic light emitting diode lighting panel (e.g., apparatus), but embodiments of the present disclosure are not limited thereto.

According to another embodiment of the present disclosure, the vibration member 100 can include a plate, but can otherwise have any shape, such as a circular, oval, triangular or the like. The plate can include a metal material, or can include a single nonmetal material or a complex nonmetal material including one or more of wood, plastic, ceramic, glass, cloth, fiber, rubber, paper, mirror, and leather, but embodiments of the present disclosure are not limited thereto. According to another embodiment of the present disclosure, the vibration member 100 can include a plate. The plate can include one or more of metal, wood, plastic, glass, cloth, fiber, rubber, paper, mirror, and leather, but embodiments of the present disclosure are not limited thereto. For example, the paper can be a cone paper for speakers. For example, the cone paper can be comprised of pulp or a foam plastic, but embodiments of the present disclosure are not limited thereto. For example, the vibration member 100 can be a vibration object, a vibration plate, or a front member, but embodiments of the present disclosure are not limited thereto.

The vibration apparatus 200 according to an embodiment of the present disclosure can be disposed on the rear surface of the vibration member 100 to overlap the display area (e.g., active area) AA of the vibration member 100. For example, the vibration apparatus 200 can overlap a display area AA, corresponding to half or more, of the display area AA of the vibration member 100. According to another embodiment of the present disclosure, the vibration apparatus 200 can overlap the whole display area AA of the vibration member 100.

When an alternating current (AC) voltage is applied, the vibration apparatus 200 according to an embodiment of the present disclosure can alternately contract and expand based on an inverse piezoelectric effect and can vibrate the vibration member 100 on the basis of a vibration. According to an embodiment of the present disclosure, the vibration apparatus 200 can vibrate based on a voice signal synchronized with an image displayed by the display panel to vibrate the vibration member 100. That is, the vibration apparatus 200 can be used to produce sound based on an input from the display device or from any other input (e.g., internet-based, cable-based, etc.), where the sound matches a video displayed on the display device. According to another embodiment of the present disclosure, the vibration apparatus 200 can vibrate based on a haptic feedback signal (e.g., a tactile feedback signal) synchronized with a user touch applied to a touch panel (e.g., a touch sensor layer) which is disposed on the vibration member 100 or embedded into the vibration member 100, and thus, can vibrate the vibration member 100. Accordingly, the vibration member 100 can vibrate based on a vibration of the vibration apparatus 200 to provide a user (e.g., a viewer) with one or more of a sound and a haptic feedback.

Therefore, the apparatus according to an embodiment of the present disclosure can output a sound, generated by a vibration of the vibration member 100 based on a vibration of the vibration apparatus 200, in a forward direction of the vibration member 100. Also, the apparatus according to an embodiment of the present disclosure can vibrate a large region of the vibration member 100 by using the vibration apparatus 200 of a film type, thereby more enhancing a sense of sound localization and a sound pressure level characteristic of a sound based on a vibration of the vibration member 100. That is, the vibration apparatus enhances sound localization (e.g., the concentration of sound to a particular area or location) and improves the sound pressure level (e.g., improves the sound volume).

According to an embodiment of the present disclosure, a rear surface (e.g., a backside surface) of the vibration member 100 can include a first region (e.g., a first rear region) A1 and a second region (e.g., a second rear region) A2. For example, on the rear surface of the vibration member 100, the first region A1 can be a left rear region, and the second region A2 can be a right rear region. With a first direction X, the first region A1 and the second region A2 can be horizontally symmetrical with respect to a center line CL of the vibration member 100, but embodiments of the present disclosure are not limited thereto. For example, each of the first region A1 and the second region A2 can overlap the display area AA of the vibration member 100, including the active area AA and the non-active area IA of the display area of the vibration member 100.

The vibration apparatus 200 according to an embodiment of the present disclosure can include a first vibration apparatus 200-1 and a second vibration apparatus 200-2, which are disposed on the rear surface of the vibration member 100.

The first vibration apparatus 200-1 can be disposed in the first region A1 of the vibration member 100. For example, the first vibration apparatus 200-1 can be disposed to be close to a center portion or an edge of the first region A1 of the vibration member 100, with respect to the first direction X. The first vibration apparatus 200-1 according to an embodiment of the present disclosure can vibrate the first region A1 of the vibration member 100, and thus, can generate a first vibration sound or a first haptic feedback in the first region A1 of the vibration member 100. For example, the first vibration apparatus 200-1 according to an embodiment of the present disclosure can directly vibrate the first region A1 of the vibration member 100, and thus, can generate the first vibration sound or the first haptic feedback in the first region A1 of the vibration member 100. For example, the first vibration sound can be a left sound (e.g., a sound disposed at a left side of a user standing in front of the vibration member 100). A size of the first vibration apparatus 200-1 according to an embodiment of the present disclosure can be half or less or half or more of a size of the first region A1 on the basis of a characteristic of the first vibration sound or a sound characteristic desired by the apparatus 10. In another embodiment of the present disclosure, a size of the first vibration apparatus 200-1 can be a size corresponding to the first region A1 of the vibration member 100. For example, a size of the first vibration apparatus 200-1 can be a size which is less than or equal to that of the first region A1 of the vibration member 100.

The second vibration apparatus 200-2 can be disposed in the second region A2 of the vibration member 100. For example, the second vibration apparatus 200-2 can be disposed to be close to a center portion or an edge of the second region A2 of the vibration member 100, with respect to the first direction X. The second vibration apparatus 200-2 according to an embodiment of the present disclosure can vibrate the second region A2 of the vibration member 100, and thus, can generate a second vibration sound or a second haptic feedback in the second region A2 of the vibration member 100. For example, the second vibration apparatus 200-2 according to an embodiment of the present disclosure can directly vibrate the second region A2 of the vibration member 100, and thus, can generate the second vibration sound or the second haptic feedback in the second region A2 of the vibration member 100. For example, the second vibration sound can be a right sound. (e.g., a sound disposed at a right side of a user standing in front of the vibration member 100). A size of the second vibration apparatus 200-2 according to an embodiment of the present disclosure can be half or less or half or more of a size of the second region A2 on the basis of a characteristic of the second vibration sound or a sound characteristic desired by the apparatus. If three or more vibration apparatuses are provided, each can generate a vibration sound or a haptic feedback in different regions of the vibration member 100 to generate sound towards one or more directions. In another embodiment of the present disclosure, a size of the second vibration apparatus 200-2 can be a size corresponding to the second region A2 of the vibration member 100 or the display panel. For example, a size of the second vibration apparatus 200-2 can be a size which is less than or equal to that of the second region A2 of the vibration member 100. Accordingly, the first and second vibration apparatuses 200-1 and 200-2 can have the same size or different sizes, on the basis of a left and right sound characteristic of the apparatus 10 and/or a sound characteristic of the apparatus 10. Also, the first and second vibration apparatuses 200-1 and 200-2 can be disposed in a left and right symmetrical structure or a left and right asymmetrical structure with respect to the center line CL of the vibration member 100.

Each of the first and second vibration apparatuses 200-1 and 200-2 can include a piezoelectric material (a vibration portion or a piezoelectric vibration portion) including piezoelectric ceramic having a piezoelectric characteristic, but embodiments of the present disclosure are not limited thereto. For example, each of the first and second vibration apparatuses 200-1 and 200-2 according to an embodiment of the present disclosure can include piezoelectric ceramic having the perovskite crystalline structure, and thus, can be vibrated (e.g., mechanically displaced) in response to an electrical signal applied from the outside. For example, when the vibration driving signal (e.g., the voice signal) is applied, each of the first and second vibration apparatuses 200-1 and 200-2 can alternately and repeatedly contract and/or expand based on an inverse piezoelectric effect of the piezoelectric material (e.g., the vibration portion or the piezoelectric vibration portion), and thus, can be displaced (e.g., vibrated or driven) in the same direction on the basis of a bending phenomenon where a bending direction is alternately changed, whereby a displacement amount (e.g., a bending force) or an amplitude displacement of the vibration apparatus 200 or/and the vibration member 100 can increase or can be maximized.

A vibration generated by each of the first and second vibration apparatuses 200-1 and 200-2 can vibrate all of the first region (e.g., the first rear region) A1 and the second region (e.g., the second rear region) A2, thereby enhancing satisfaction of a user and increasing a sense of localization of a sound. Also, a contact area (e.g., a panel coverage) between the vibration member 100 and each of the first and second vibration apparatuses 200-1 and 200-2 can increase, and thus, a vibration region of the vibration member 100 can increase, thereby enhancing a sound of a middle-low-pitched sound band generated based on a vibration of the vibration member 100. Also, the vibration apparatus 200 applied to a large-sized apparatus can vibrate all of the vibration member 100 having a large size (e.g., a large area), and thus, a sense of localization of a sound based on a vibration of the vibration member 100 can be more enhanced, thereby realizing an enhanced sound effect. Accordingly, the vibration apparatus 200 according to an embodiment of the present disclosure can be disposed on the rear surface of the vibration member 100 to sufficiently vibrate the vibration member 100 in a vertical (e.g., forward and rearward) direction, thereby outputting a desired sound in a forward direction of the display apparatus or the apparatus. For example, the vibration apparatus 200 can be disposed on the rear surface of the vibration member 100 to sufficiently vibrate the vibration member 100 in a vertical (or forward and rearward) direction with respect to the first direction X, thereby outputting a desired sound in a forward direction of the display apparatus or the apparatus.

The vibration apparatus 200 according to an embodiment of the present disclosure can further include a connection member 250 for connecting the vibration apparatus 200 to the vibration member 100 and for providing an airgap between the vibration apparatus 200 and the vibration 100 to improve the sound quality/characteristics of the sound generated by the vibration apparatus. For example, the connection member 250 can be disposed between the vibration apparatus 200 and the vibration member 100. For example, the connection member 250 can be disposed between each of the first and second vibration apparatuses 200-1 and 200-2 and the vibration member 100.

The connection member 250 can be disposed between each of the first and second vibration apparatuses 200-1 and 200-2 and the vibration member 100. For example, the vibration apparatus 200 can be connected or coupled to the rear surface of the vibration member 100 by using the connection member 250, and thus, can be supported by or disposed on the rear surface of the vibration member 100.

According to another embodiment of the present disclosure, the connection member 250 can further include a hollow portion provided between the vibration apparatus 200 and the vibration member 100. The hollow portion of the connection member 250 can provide an air gap between the vibration apparatus 200 and the vibration member 100. Based on the air gap, a sound wave (e.g., a sound pressure level) based on a vibration of the vibration apparatus 200 may not be dispersed by the connection member 250 and can concentrate on the vibration member 100, and thus, the loss of a vibration based on the connection member 250 can be minimized, thereby increasing a sound pressure level characteristic and/or a sound characteristic of a sound generated based on a vibration of the vibration member 100. For instance, the connection member 250 can provide improved directional control over the sound generated by the vibration member 100.

The apparatus according to an embodiment of the present disclosure can further include a connection member 250 (e.g., a first connection member) between the vibration apparatus 200 and the vibration member 100 or the display panel.

For example, the connection member 250 can be disposed between the vibration apparatus 200 and the rear surface of the vibration member 100 or the display panel, and thus, can connect or couple the vibration apparatus 200 to the rear surface of the vibration member 100. For example, the vibration apparatus 200 can be connected or coupled to the rear surface of the vibration member 100 or the display panel by using the connection member 250, and thus, can be supported by or disposed on the rear surface of the vibration member 100 or the display panel. For example, the vibration apparatus 200 can be disposed on the rear surface of the vibration member 100 or the display panel by using the connection member 250.

The connection member 250 according to an embodiment of the present disclosure can include a material including an adhesive layer which is good in adhesive force or attaching force with respect to each of the rear surface of the vibration member 100 and the vibration apparatus 200. For example, the connection member 250 can include a foam pad, a double-sided tape, or an adhesive, but embodiments of the present disclosure are not limited thereto. For example, an adhesive layer of the connection member 250 can include epoxy, acryl, silicone, or urethane, but embodiments of the present disclosure are not limited thereto. For example, the adhesive layer of the connection member 250 can include an acryl-based material, having a characteristic where an adhesive force is relatively good and hardness is high, among acryl and urethane. Accordingly, a vibration of the vibration apparatus 200 can be well transferred to the vibration member 100. Instead of an adhesive member, the connection member 250 can be fixed to the vibration apparatus 200 and the vibration member 100 via a fastener or a plurality of fasteners, welding, soldering, or the like.

The adhesive layer of the connection member 250 can further include an additive such as a tackifier, a wax component, or an anti-oxidation agent, but embodiments of the present disclosure are not limited thereto. The additive can prevent the connection member 250 from being detached (stripped) from the vibration member 100 by a vibration of the vibration apparatus 200. For example, the tackifier can be rosin derivative, the wax component can be paraffin wax, and the anti-oxidation agent can be a phenol-based anti-oxidation agent, such as thiolester, but embodiments of the present disclosure are not limited thereto.

According to another embodiment of the present disclosure, the connection member 250 can further include a hollow portion provided between the vibration apparatus 200 and the vibration member 100. The hollow portion of the connection member 250 can provide an air gap between the vibration apparatus 200 and the vibration member 100 or the display panel. Based on the air gap, a sound wave (e.g., a sound pressure level) based on a vibration of the vibration apparatus 200 may not be dispersed by the connection member 250 and can concentrate on the vibration member 100 or the display panel, and thus, the loss of a vibration based on the connection member 250 can be minimized, thereby increasing a sound pressure level characteristic and/or a sound characteristic of a sound generated based on a vibration of the vibration member 100.

The apparatus 10 according to an embodiment of the present disclosure can further include a supporting member 300 which is disposed on the rear surface (e.g., a backside surface) of the vibration member 100.

The supporting member 300 can be disposed on the rear surface of the vibration member 100 or the display panel. For example, the supporting member 300 can cover the whole rear surface of the vibration member 100 or the display panel. For example, the supporting member 300 can include one or more of a ceramic material, glass material, a metal material, and a plastic material. For example, the supporting member 300 can have multiple layers and can be a rear structure, a set structure, a supporting structure, a supporting cover, a rear member, a case, or a housing, but the terms are not limited thereto. The supporting member 300 can be referred to as the other term such as a cover bottom, a plate bottom, a back cover, a base frame, a metal frame, a metal chassis, a chassis base, or an m-chassis. For example, the supporting member 300 can be implemented as an arbitrary type frame (e.g., a frame having any shape) or a plate structure disposed on the rear surface of the vibration member 100.

An edge or a sharp corner portion of the supporting member 300 can have an inclined shape or a curved shape through a chamfer process or a corner rounding process. For example, the glass material of the supporting member 300 can be sapphire glass. In another embodiment of the present disclosure, the supporting member 300 including the metal material can include one or more materials of aluminum (Al), stainless-steel, titanium (Ti), an Al alloy, a magnesium (Mg) alloy, and an iron (Fe)-nickel (Ni) alloy.

The supporting member 300 according to an embodiment of the present disclosure can include a first supporting member 310 and a second supporting member 330.

The first supporting member 310 can be disposed between the second supporting member 330 and the rear surface of the vibration member/display panel 100. For example, the first supporting member 310 can be disposed between a front edge of the second supporting member 330 and a rear edge of the display panel 100. The first supporting member 310 can support one or more of an edge portion of the second supporting member 330 and an edge portion of the display panel 100. In another embodiment of the present disclosure, the first supporting member 310 can cover the rear surface of the display panel 100. For example, the first supporting member 310 can cover the whole rear surface of the display panel 100 or the first supporting member 310 can cover less than the whole rear surface of the display panel 100. For example, the first supporting member 310 can be a member which covers the whole rear surface of the display panel 100. For example, the first supporting member 310 can include one or more of a glass/ceramic material, a metal material, and a plastic material. For example, the first supporting member 310 can be an inner plate, a first rear structure, a first supporting structure, a first supporting cover, a first back cover, a first rear member, an internal plate, or an internal cover, but the terms are not limited thereto. As another example, the first supporting member 310 can be omitted.

The first supporting member 310 can be apart (e.g., spaced apart) from the rearmost surface of the vibration member 100 with the gap space GS therebetween, or can be apart from the vibration apparatus 200. For example, the gap space GS can be referred to as an air gap, a vibration space, and a sound sounding box, but the terms are not limited thereto.

The second supporting member 330 can be disposed on a rear (e.g., back) surface of the first supporting member 310. The second supporting member 330 can be a member which covers the whole rear surface of the display panel 100 or the second supporting member 143 can be a member which covers less than the whole rear surface of the display panel 100. For example, the second supporting member 330 can include one or more of a glass material, a metal material, and a plastic material. For example, the second supporting member 330 can be an outer plate, a rear plate, a back plate, a back cover, a rear cover, a second rear structure, a second supporting structure, a second supporting cover, a second back cover, a second rear member, an external plate, or an external cover, but the terms are not limited thereto.

The supporting member 300 according to an embodiment of the present disclosure can further include a connection member (e.g., a second connection member) 350.

The connection member 350 can be disposed between (e.g., directly between) the first supporting member 310 and the second supporting member 330. For example, the first supporting member 310 can be coupled or connected to the second supporting member 330 by using the connection member 350. For example, the connection member 350 can be an adhesive resin, a double-sided tape, or a double-sided adhesive foam pad, but embodiments of the present disclosure are not limited thereto. For example, the connection member 350 can have elasticity for impact absorption, but embodiments of the present disclosure are not limited thereto. For example, the connection member 350 can be disposed in a whole region between the first supporting member 310 and the second supporting member 330 or less than the whole region between the first supporting member 310 and the second supporting member 330. In another embodiment of the present disclosure, the connection member 350 can be formed in a mesh structure (e.g., a grid structure having holes between grid lines) including an air gap between the first supporting member 310 and the second supporting member 330. That is, the connection member 350 can provided an air gap between the first supporting member 310 and the second support member 330 by being in the form of a porous material or a material having a grid or mesh structure.

The apparatus according to an embodiment of the present disclosure can further include a middle frame 400. The middle frame 400 can be disposed between a rear edge of the display panel or the vibration member 100 and a front edge of the supporting member 300. The middle frame 400 can support one or more of an edge portion of the vibration member 100 and an edge portion of the supporting member 300. For instance, the middle frame 400 can support side surfaces of the vibration member 100 and the supporting member 300, including an entire longitudinal side surface of the vibration member 100 and the supporting member 300. The middle frame 400 can surround one or more of lateral surfaces of each of the vibration member 100 and the supporting member 300. The middle frame 400 can provide the gap space GS between the display panel and the supporting member 300 and can attach the display panel 100 to the supporting member 300. The middle frame 400 can be referred to as a middle cabinet, a middle cover, a middle chassis, a connection member, a frame, a frame member, a middle member, or a lateral cover member, but the terms are not limited thereto.

The middle frame 400 according to an embodiment of the present disclosure can include a first supporting portion 410 and a second supporting portion 430. For example, the first supporting portion 410 can be a supporting portion, but the terms are not limited thereto. For example, the second supporting portion 430 can be a sidewall portion, but the terms are not limited thereto.

The first supporting portion 410 can be disposed between a rear edge of the vibration member 100 and a front edge of the supporting member 300, and thus, can provide a gap space GS between the vibration member 100 and the supporting member 300. The first support portion 410 can extend in the longitudinal direction (e.g., in the Y direction). A front surface of the first supporting portion 410 can be coupled or connected to the rear edge of the vibration member 100 by a first adhesive member 401. A rear surface of the first supporting portion 410 can be coupled or connected to the front edge (e.g., front surface) of the supporting member 300 by a second adhesive member 403. For example, the first supporting portion 410 can have a single picture frame structure having a tetragonal shape or a picture frame structure having a plurality of division bar forms, but embodiments of the present disclosure are not limited thereto.

The second supporting portion 430 can be disposed in parallel with a thickness direction (e.g., third direction) Z of the apparatus. For example, the second supporting portion 430 can be vertically coupled to an outer surface of the first supporting portion 410 in parallel with the thickness direction Z of the apparatus. The second supporting portion 430 can surround one or more of an outer surface of the vibration member 100 and an outer surface of the supporting member 300, thereby protecting the outer surface of each of the vibration member 100 and the supporting member 300. The first supporting portion 410 can protrude from an inner surface of the second supporting portion 430 to the gap space GS between the vibration member 100 and the supporting member 300.

The apparatus according to an embodiment of the present disclosure can include a panel connection member (e.g., a connection member) instead of the middle frame 400.

The panel connection member can be disposed between the rear edge of the vibration member 100 and the front edge of the supporting member 300, and thus, can provide a gap space GS between the vibration member 100 and the supporting member 300. The panel connection member can be disposed between the rear edge of the vibration member 100 and the front edge of the supporting member 300 and can attach the vibration member 100 on the supporting member 300. For example, the panel connection member can be implemented with a double-sided tape, a single-sided tape, or a double-sided adhesive foam pad, but embodiments of the present disclosure are not limited thereto. For example, an adhesive layer of the panel connection member can include epoxy, acryl, silicone, or urethane, but embodiments of the present disclosure are not limited thereto. For example, in order to minimize the transfer of a vibration of the vibration member 100 to the supporting member 300, the adhesive layer of the panel connection member can include a urethane-based material, having a relatively ductile characteristic compared to acryl, among acryl and urethane. Accordingly, a vibration of the display panel 100 transferred to the supporting member 300 can be minimized.

According to another embodiment of the present disclosure, in the apparatus according to an embodiment of the present disclosure, the middle frame 400 can be omitted. Instead of the middle frame 400, a panel connection member or an adhesive can be provided. According to another embodiment of the present disclosure, instead of the middle frame 400, a partition can be provided.

Figure 3:
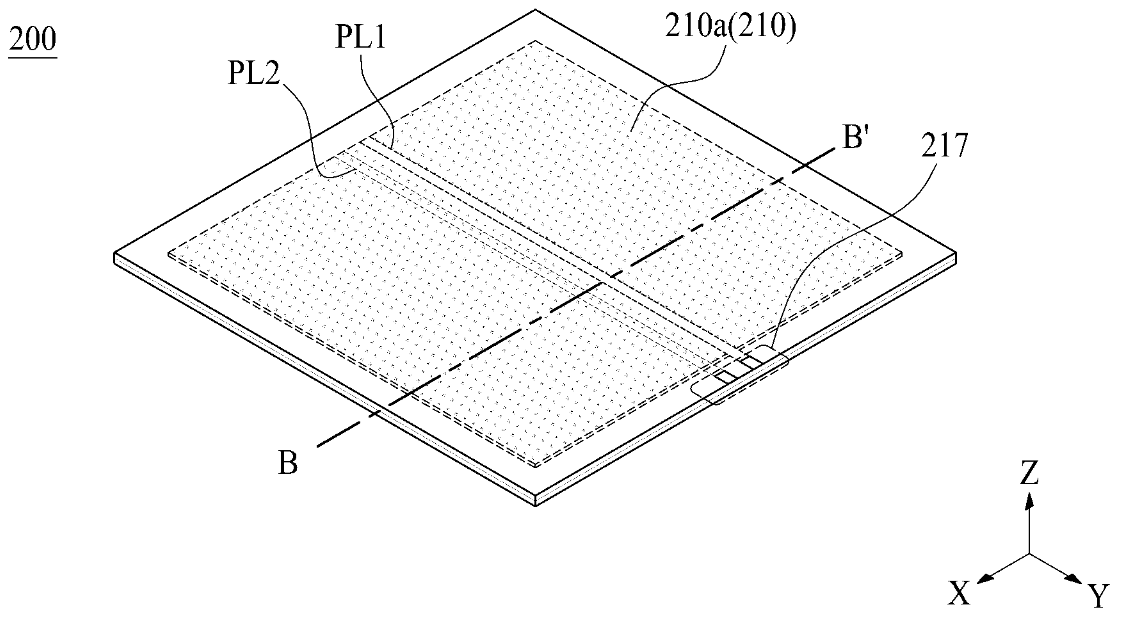
FIG. 3 is a perspective view of a vibration apparatus according to an embodiment of the present disclosure.
Figure 4:
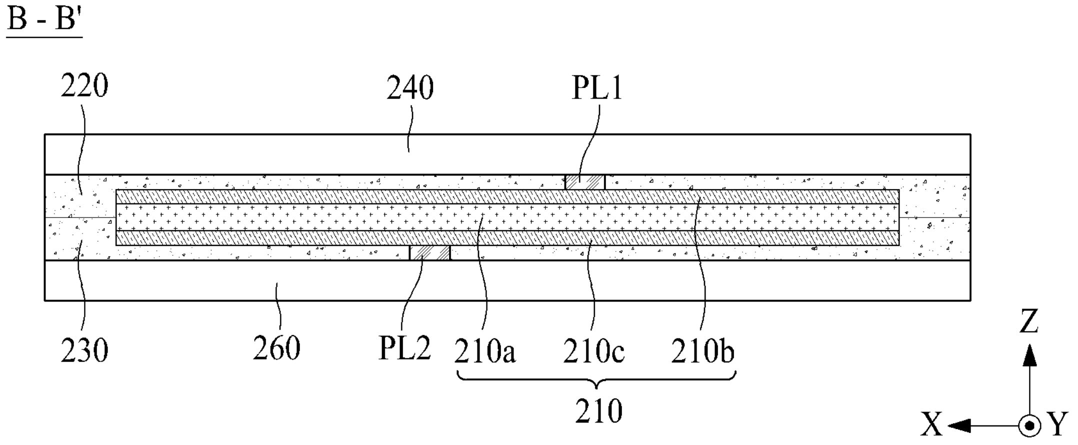
FIG. 4 is a cross-sectional view taken along line B-B' of FIG. 3.

FIG. 3 is a perspective view of a vibration apparatus according to an embodiment of the present disclosure, and FIG. 4 is a cross-sectional view taken along line B-B' of FIG. 3.

With reference to FIGS. 3 and 4, the vibration apparatus 200 according to an embodiment of the present disclosure can be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion **210*a* can include a piezoelectric material. For example, the vibration portion 210*a* can include a piezoelectric material (e.g., an electroactive material) having a piezoelectric effect. For example, the piezoelectric material can have a characteristic where pressure or twisting is applied to a crystalline structure by an external force, a potential difference occurs due to dielectric polarization (e.g., poling) caused by a relative position change of a positive (+) ion and a negative (−) ion, and a vibration is generated by an electric field based on a voltage applied thereto. The vibration portion 210*a* can be referred to as the terms such as a vibration layer, a piezoelectric layer, a piezoelectric material layer, an electroactive layer, a vibration portion, a piezoelectric material portion, an electroactive portion, a piezoelectric material, a piezoelectric composite layer, a piezoelectric composite, or a piezoelectric ceramic composite, but the terms are not limited thereto. The vibration portion 210*a*** can include a transparent conductive material, a semitransparent conductive material, or an opaque conductive material and can be transparent, semitransparent, or opaque.

The vibration portion 210*a* according to an embodiment of the present disclosure can include a ceramic-based material for generating a relatively high vibration, or can include a piezoelectric ceramic having a perovskite-based crystalline structure. The perovskite crystalline structure can have a piezoelectric effect and/or an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A" and "B" can be cations, and "O" can be anions. For example, the vibration portion 210*a* can include one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion can be changed by an external stress or a magnetic field to vary polarization (e.g., poling), and a piezoelectric effect can be generated based on the variation of the polarization (e.g., poling). In a perovskite crystalline structure including $PbTiO_3$, a position of a Ti ion corresponding to a center ion can be changed to vary polarization (e.g., poling), and thus, a piezoelectric effect can be generated. For example, in the perovskite crystalline structure, a cubic shape having a symmetric structure can be changed to a tetragonal shape, an orthorhombic shape, and a rhombohedral shape each having an unsymmetric structure by using an external stress or a magnetic field, and thus, a piezoelectric effect can be generated. Polarization (e.g., poling) can be high at a morphotropic phase boundary (MPB) of a tetragonal structure and a rhombohedral structure, and polarization (e.g., poling) can be easily realigned, thereby obtaining a high piezoelectric characteristic.

According to an embodiment of the present disclosure, the vibration portion 210*a* can include one or more materials among lead (Pb), zirconium (Zr), titanium (Ti), zinc (Zn), nickel (Ni), and niobium (Nb), but embodiments of the present disclosure are not limited thereto.

The vibration portion 210*a* according to another embodiment of the present disclosure can include single crystalline ceramic and/or polycrystalline ceramic. The single crystalline ceramic can be a material where particles having a single crystal domain having a certain structure are regularly arranged. The polycrystalline ceramic can include irregular particles where various crystal domains are provided.

According to another embodiment of the present disclosure, the vibration portion 210*a* can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration portion 210*a* can include one or more of calcium titanate ($CaTiO_3$), $BaTiO_3$, and $SrTiO_3$, each including no Pb, but embodiments of the present disclosure are not limited thereto.

According to another embodiment of the present disclosure, the vibration portion 210*a* can have a piezoelectric deformation coefficient "$d_{33}$" of 1,000 pC/N or more in the thickness direction Z. By having a high piezoelectric deformation coefficient "$d_{33}$", it is possible to provide the vibrating apparatus that can be applied to a display panel or a vibration member (e.g., a vibration object) having a large size or can have a sufficient vibration characteristic or piezoelectric characteristic. For example, in order to have a high piezoelectric deformation coefficient "$d_{33}$", the inorganic material portion can include a PZT-based material ($PbZrTiO_3$) as a main component and can include a softener dopant material doped into A site (Pb) and a relaxor ferroelectric material doped into B site (ZrTi).

The softener dopant material can enhance a piezoelectric characteristic and a dielectric characteristic of the vibration portion 210*a*. For example, the softener dopant material can increase the piezoelectric deformation coefficient "$d_{33}$" of the inorganic material portion. The softener dopant material according to an embodiment of the present disclosure can include a dyad element "+2" to a triad element "+3". Morphotropic phase boundary (MPB) can be implemented by adding the softener dopant material to the PZT-based material ($PbZrTiO_3$), and thus, a piezoelectric characteristic and a dielectric characteristic can be enhanced. For example, the softener dopant material can include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) can substitute a portion of lead (Pb) in the PZT-based material ($PbZrTiO_3$), and a substitution rate thereof can be about 2 mol % to about 20 mol %. For example, when the substitution rate is smaller than 2 mol % or greater than 20 mol %, a perovskite crystal structure can be broken, and thus, an electromechanical coupling coefficient "kP" and the piezoelectric deformation coefficient "$d_{33}$" can decrease. When the softener dopant material is substituted, the MPB can be formed, and a piezoelectric characteristic and a dielectric characteristic can be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) can enhance an electric deformation characteristic of the inorganic material portion. The relaxor ferroelectric material according to an embodiment of the present disclosure can include a PMN-based material, a PNN-based material, a PZN-based material, or a PIN-based material, but embodiments of the present disclosure are not limited thereto. The PMN-based material can include Pb, Mg, and Nb, and for example, can include $Pb(Mg, Nb)O_3$. The PNN-based material can include Pb, Ni, and Nb, and for example, can include $Pb(Ni, Nb)O_3$. The PZN-based material can include Pb, Zr, and Nb, and for example, can include $Pb(Zn, Nb)O_3$. The PIN-based material can include Pb, In, and Nb, and for example, can include $Pb(In, Nb)O_3$. For example, the relaxor ferroelectric material doped into the PZT-based material ($PbZrTiO_3$) can substitute a portion of each of zirconium (Zr) and titanium (Ti) in the PZT-based material ($PbZrTiO_3$), and a substitution rate thereof can be about 5 mol % to about 25 mol %. For example, when the substitution rate is smaller than 5 mol % or greater than 25 mol %, a perovskite crystal structure can be broken, and thus, the electromechanical coupling coefficient "kP" and the piezoelectric deformation coefficient "$d_{33}$" can decrease.

According to an embodiment of the present disclosure, the vibration portion 210*a* can further include a donor material doped into B site (ZrTi) of the PZT-based material ($PbZrTiO_3$), in order to more enhance a piezoelectric coefficient. For example, the donor material doped into the B site (ZrTi) can include a tetrad element "+4" or a hexad element "+6". For example, the donor material doped into the B site (ZrTi) can include tellurium (Te), germanium (Ge), uranium (U), bismuth (Bi), niobium (Nb), tantalum (Ta), antimony (Sb), or tungsten (W).

The vibration portion 210*a* according to an embodiment of the present disclosure can have a piezoelectric deformation coefficient "$d_{33}$" of 1,000 pC/N or more in the thickness direction Z, and thus, a vibration apparatus 200 having an enhanced vibration characteristic can be implemented. For example, a vibration apparatus 200 having an enhanced vibration characteristic can be implemented in an apparatus or a vibration object having a large area.

The first electrode portion 210*b* can be disposed on a first surface (e.g., an upper surface) of the vibration portion 210*a* and can be electrically connected to a first surface of the vibration portion 210*a*. The second electrode portion 210*c* can be disposed on a second surface (e.g., a lower surface) of the vibration portion 210*a* and can be electrically connected to a second surface of the vibration portion 210*a*. For example, the vibration portion 210*a* can be polarized (e.g., poling) by a certain voltage applied to the first electrode portion 210*b* and the second electrode portion 210*c* in a certain temperature atmosphere or a temperature atmosphere which is changed from a high temperature to a room temperature, but embodiments of the present disclosure are not limited thereto.

For example, the first electrode portion 210*b* can have a common electrode form which is disposed on a whole first surface of the vibration portion 210*a*, as shown in FIG. 4. The first electrode portion 210*b* according to an embodiment of the present disclosure can include a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include aluminum (Al), copper (Cu), gold (Au), silver (Ag), molybdenum (Mo), or magnesium (Mg), or an alloy thereof, but embodiments of the present disclosure are not limited thereto.

The second electrode portion 210*c* can be disposed on a second surface (e.g., a rear surface or a backside surface), which is opposite to the first surface, of the vibration portion 210*a* and can be electrically connected to the second surface of the vibration portion 210*a*. For example, the second electrode portion 210*c* can have a common electrode form which is disposed on the whole second surface of the vibration portion 210*a*. The second electrode portion 210*c* according to an embodiment of the present disclosure can include a transparent conductive material, a semitransparent conductive material, or an opaque conductive material. For example, the second electrode portion 210*c* can include the same material as that of the first electrode portion 210*b*, but embodiments of the present disclosure are not limited thereto. In another embodiment of the present disclosure, the second electrode portion 210*c* can include a material which differs from that of the first electrode portion 210*b*.

According to another embodiment of the present disclosure, the vibration apparatus 200 can further include a first cover member 240 and a second cover member 260.

The first cover member 240 can be disposed on a first surface of the vibration apparatus 200. For example, the first cover member 240 can be disposed at the first electrode portion 210*b*. For example, the first cover member 240 can be on the first electrode portion 210*b*. For example, the first cover member 240 can cover the first electrode portion 210*b* disposed on the first surface of the vibration portion 210*a*, and thus, can protect the first surface of the vibration portion 210*a* or the first electrode portion 210*b*.

The second cover member 260 can be disposed on a second surface of the vibration apparatus 200. For example, the second cover member 260 can be disposed at the second electrode portion 210*c*. For example, the second cover member 260 can be on the second electrode portion 210*c*. For example, the second cover member 260 can cover the second electrode portion 210*c* disposed on the second surface of the vibration portion 210*a*, and thus, can protect the second surface of the vibration portion 210*a* or the second electrode portion 210*c*.

Each of the first cover member 240 and the second cover member 260 according to an embodiment of the present disclosure can include one or more materials of plastic, metal, ceramic, fiber, and wood, but embodiments of the present disclosure are not limited thereto. For example, the first cover member 240 and the second cover member 260 can include the same material or different materials. For example, the first cover member 240 and the second cover member 260 can be a polyimide film or a polyethylene terephthalate film, but embodiments of the present disclosure are not limited thereto.

According to another embodiment of the present disclosure, the vibration apparatus 200 can further include a first adhesive layer 220 and a second adhesive layer 230. For example, the first adhesive layer 220 can be disposed between the first cover member 240 and the first electrode portion 210*b*. For example, the second adhesive layer 230 can be disposed between the second cover member 260 and the second electrode portion 210*c*.

The first cover member 240 according to an embodiment of the present disclosure can be disposed on the first surface of the vibration portion 210*a* by using the first adhesive layer 220. For example, the first cover member 240 can be connected or coupled to the first electrode portion 210*b* by using the first adhesive layer 220. For example, the first cover member 240 can be disposed on the first surface of the vibration portion 210*a* by a film laminating process using the first adhesive layer 220. Accordingly, the vibration portion 210*a* can be provided (e.g., disposed) as one body with the first cover member 240.

The second cover member 260 according to an embodiment of the present disclosure can be disposed on the second surface of the vibration portion 210*a* by using the second adhesive layer 230. For example, the second cover member 260 can be connected or coupled to the second electrode portion 210*c* by using the second adhesive layer 230. For example, the second cover member 260 can be disposed on the second surface of the vibration portion 210*a* by a film laminating process using the second adhesive layer 230. Accordingly, the vibration portion 210*a* can be provided (e.g., disposed) as one body with the second cover member 260. The first adhesive layer 220 can be adhesively attached to the second adhesive layer 230.

For example, the first and second adhesive layers 220 and 230 can fully surround the vibration apparatus 200. For example, the first and second adhesive layers 220 and 230 can be disposed between the first cover member 240 and the second cover member 260 to surround the vibration portion 210*a*, the first electrode portion 210*b*, and the second electrode portion 210*c*. For example, the first and second adhesive layers 220 and 230 can be disposed between the first cover member 240 and the second cover member 260 to fully surround the vibration portion 210*a*, the first electrode portion 210*b*, and the second electrode portion 210*c*. For example, the vibration portion 210*a*, the first electrode portion 210*b*, and the second electrode portion 210*c* can be buried or embedded between the first adhesive layer 220 and the second adhesive layer 230. For convenience of description, the first adhesive layer 220 and the second adhesive layer 230 are illustrated as the first adhesive layer 220 and the second adhesive layer 230, but are not limited thereto and can be provided as one adhesive layer.

Each of the first adhesive layer 220 and the second adhesive layer 230 according to an embodiment of the present disclosure can include an electrical insulation material which has adhesive properties and is capable of compression and decompression. For example, each of the first adhesive layer 220 and the second adhesive layer 230 can include epoxy resin, acrylic resin, silicone resin, and urethane resin, but embodiments of the present disclosure are not limited thereto.

The audio controller can generate an alternating current (AC) vibration driving signal including a first vibration driving signal and a second vibration driving signal on the basis of a sound source. The first vibration driving signal can be one of a positive (+) vibration driving signal and a negative (−) vibration driving signal, and the second vibration driving signal can be one of a positive (+) vibration driving signal and a negative (−) vibration driving signal. For example, the first vibration driving signal can be supplied to the first electrode portion 210*b* of the vibration apparatus 200 through the terminal of the signal cable 219, the pad electrode of the pad portion, and a first power supply line. The second vibration driving signal can be supplied to the second electrode portion 210*c* of the vibration apparatus 200 through the terminal of the signal cable, the pad electrode of the pad portion, and a second power supply line.

According to an embodiment of the present disclosure, the vibration portion 210*a* can be configured (e.g., formed) as one body by the first and second cover members 240 and 260, thereby providing a vibration apparatus having a simplified structure and a thin thickness.

One or more first power supply lines PL1 in the vibration apparatus 200 can extend long in a second direction Y. The first power supply line PL1 can be disposed at the first cover member 240 and can be electrically connected (e.g., directly electrically connected) to the first electrode portion 210*b*. For example, the first power supply line PL1 can be disposed on a rear surface of the first cover member 240 facing the first electrode portion 210*b* and can be electrically connected to the first electrode portion 210*b* and can be disposed on at least a portion of a top surface of the first electrode portion 210. For example, the first power supply line PL1 can be disposed on the rear surface of the first cover member 240 directly facing the first electrode portion 210*b* and can be electrically and directly connected to the first electrode portion 210*b*. For example, the first power supply line PL1 can be electrically connected to the first electrode portion 210*b* by using an anisotropic conductive film. As another example, the first power supply line PL1 can be electrically connected to the first electrode portion 210*b* through a conductive material (e.g., particle) included in the first adhesive layer 212.

For example, one or more first power supply lines PL1 in the first and second vibration apparatuses 200-1 and 200-2 can include one or more first power lines which protrude in a first direction X intersecting with the second direction Y. The one or more first power lines can extend long from one or more of one surface and the other surface of the first power supply line PL1 in the first direction X and can be electrically connected to the first electrode portion 210*b*. Accordingly, the one or more first power lines can enhance the uniformity of a vibration driving signal applied to the first electrode portion 210*b*.

The pad portion 217 can be electrically connected to a first portion (e.g., one side or one end) of one or more of the first power supply line PL1 and the second power supply line PL2. For example, the pad portion 217 can be disposed at an edge portion of one or more of the first cover member 240 and the second cover member 260.

The pad portion 217 according to an embodiment can include a first pad electrode, which is electrically connected to a first portion (e.g., one side or one end) of the first power supply line PL1, and a second pad electrode which is electrically connected to a first portion (e.g., one side or one end) of the second power supply line PL2. For example, one or more of the first pad electrode and the second pad electrode can be exposed at a first edge portion of one or more of the first cover member 240 and the second cover member 260.

Figure 5A:
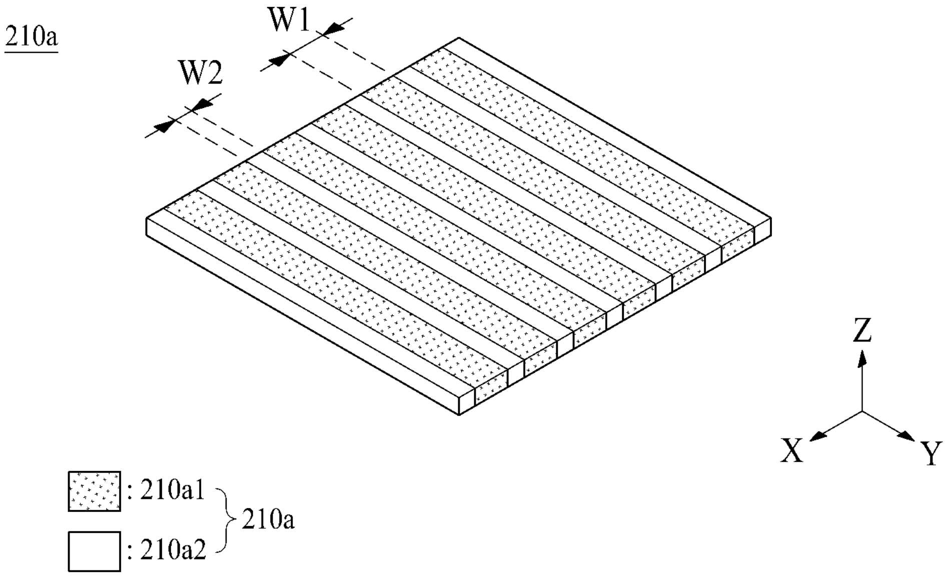
FIGS. 5A and 5B are perspective views of a vibration portion according to an embodiment of the present disclosure.
Figure 5B:
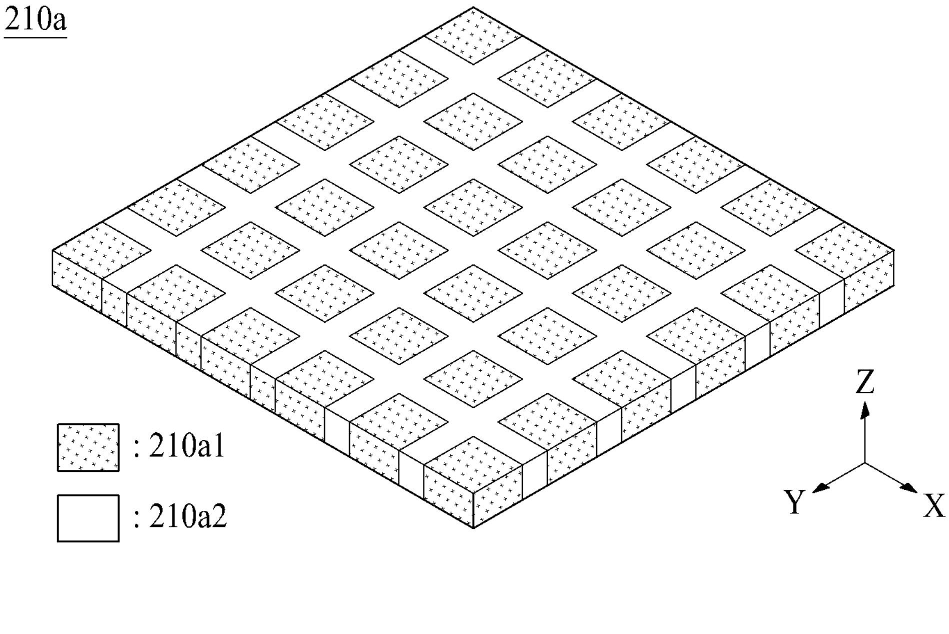

FIGS. 5A and 5B are perspective views of a vibration portion according to an embodiment of the present disclosure.

With reference to FIGS. 5A and 5B, the vibration device according to an embodiment of the present disclosure can be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 210*a* according to an embodiment of the present disclosure can include a plurality of first portions 210*a*1 and a plurality of second portions 210*a*2 alternatively disposed. For example, the plurality of first portions 210*a*1 and the plurality of second portions 210*a*2 can be alternately and repeatedly arranged in a first direction X (e.g., a second direction Y). For example, the first direction X can be a widthwise direction of the vibration portion 210*a* and the second direction Y can be a lengthwise direction of the vibration portion 210*a* intersecting with the first direction X, but embodiments of the present disclosure are not limited thereto and the first direction X can be a lengthwise direction of the vibration portion 210*a* and the second direction Y can be a widthwise direction of the vibration portion 210*a*.

For example, the first portion 210*a*1 can include an inorganic material, and the second portion 210*a*2 can include an organic material. For example, the first portion 210*a*1 can have a piezoelectric material, and the second portion 210*a*2 can have a ductile characteristic or flexibility to allow for the generation of sound. For example, the inorganic material of the first portion 210*a*1 can have a piezoelectric material, and the organic material of the second portion 210*a*2 can have a ductile characteristic or flexibility.

Each of the plurality of first portions 210*a*1 can include an inorganic material portion. The inorganic material portion can include a piezoelectric material, a composite piezoelectric material, or an electroactive material, which has a piezoelectric effect.

Each of the plurality of first portions 210*a*1 can include a ceramic-based material for generating a relatively high vibration, or can include a piezoelectric ceramic having a perovskite-based crystalline structure. The perovskite crystalline structure can have a piezoelectric effect and/or an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A" and "B" can be cations, and "O" can be anions. For example, each of the plurality of first portions 210_a_1 can include one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion can be changed by an external stress or a magnetic field to vary polarization (e.g., poling), and a piezoelectric effect can be generated based on the variation of the polarization (e.g., poling). In a perovskite crystalline structure including $PbTiO_3$, a position of a Ti ion corresponding to a center ion can be changed to vary polarization (e.g., poling), and thus, a piezoelectric effect can be generated. For example, in the perovskite crystalline structure, a cubic shape having a symmetric structure can be changed to a tetragonal shape, an orthorhombic shape, and a rhombohedral shape each having an unsymmetric structure by using an external stress or a magnetic field, and thus, a piezoelectric effect can be generated. Polarization (e.g., poling) can be high at a morphotropic phase boundary (MPB) of a tetragonal structure and a rhombohedral structure, and polarization (e.g., poling) can be easily realigned, thereby obtaining a high piezoelectric characteristic.

Each of the plurality of first portions 210_a_1 can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, each of the plurality of first portions 210_a_1 can include one or more of calcium titanate ($CaTiO_3$), $BaTiO_3$, and $SrTiO_3$, each including no Pb, but embodiments of the present disclosure are not limited thereto.

Each of a plurality of second portions 210_a_2 according to an embodiment of the present disclosure can include an organic material portion. The organic material portion included in the second portion 210_a_2 can include an organic material, an organic polymer, an organic piezoelectric material, or an organic non-piezoelectric material having a flexible characteristic compared to the inorganic material portion which is the first portion 210_a_1. For example, the second portion 210_a_2 can be referred to as an adhesive portion, a stretch portion, a bending portion, a damping portion, or a flexible portion having flexibility, but embodiments of the present disclosure are not limited thereto. For example, the organic material portion can be disposed between two adjacent inorganic material portions, and thus, can absorb an impact applied to the inorganic material portion (e.g., a first portion) and can release a stress which concentrates on the inorganic material portion, thereby enhancing the durability of the vibration portion 210_a_ or the vibration device 210 and providing flexibility to the vibration portion 210_a_ or the vibration device 210.

Each of the plurality of second portions 210_a_2 can be disposed between the plurality of first portions 210_a_1. Therefore, in the vibration portion 210_a_ or the vibration device 210, vibration energy based on a link in a unit lattice of the first portion 210_a_1 can be increased by the second portion 210_a_2, and thus, a vibration characteristic can increase and a piezoelectric characteristic and flexibility can be secured. For example, the second portion 210_a_2 can include one of an epoxy-based polymer, an acrylic-based polymer, and a silicone-based polymer, but embodiments of the present disclosure are not limited thereto.

The second portion 210_a_2 according to an embodiment of the present disclosure can have a modulus and viscoelasticity that are lower than those of the first portion 210_al_, and thus, the second portion 210_a_2 can enhance the reliability of the first portion 210_a_1 vulnerable to an impact due to a fragile characteristic of the first portion 210_a_1. For example, the second portion 210_a_2 can include a material having a loss coefficient of about 0.01 to about 1 and a modulus of about 0.1 [GPa] to about 10 [GPa].

In the vibration portion 210_a_, the plurality of first portions 210_a_1 and the plurality of second portions 210_a_2 can be disposed (e.g., arranged) in parallel on the same plane (e.g., the same layer). Each of the plurality of second portions 210_a_2 can be configured to fill a gap between two adjacent first portions 210_al_, and thus, each of the plurality of second portions 210_a_2 can be connected to or attached on an adjacent first portion 210_a_1. Accordingly, the vibration portion 210_a_ can extend by a desired size or length on the basis of lateral coupling (e.g., connection) of the first portion 210_a_1 and the second portion 210_a_2.

With reference to FIG. 5A, a plurality of first portions 210_a_1 and a plurality of second portions 210_a_2 can be alternately and repeatedly arranged in a first direction X and each of the plurality of first portions 210_a_1 and the plurality of second portions 210_a_2 can have a rectangular cross-sectional shape. Each of the plurality of first portions 210_a_1 can be disposed between the plurality of second portions 210_a_2. For example, each of the plurality of first portions 210_a_1 can have a first width W1 parallel to the first direction X and a length parallel to the second direction Y. Each of the plurality of second portions 210_a_2 can have a second width W2 parallel to the first direction X and a length parallel to the second direction Y. The first width W1 can be the same as or different from the second width W2. For example, the first width W1 can be greater than the second width W2. For example, the first portion 210_a_1 and the second portion 210_a_2 can include a line shape or a stripe shape having the same size or different sizes. Accordingly, the vibration portion 210_a_ illustrated in FIG. 5A can have a 2-2 composite structure and can have a resonance frequency of 20 kHz or less, but embodiments of the present disclosure are not limited thereto. For example, a resonance frequency of the vibration portion 210_a_ can vary based on one or more of a shape, a length, and a thickness of the vibration portion.

In the vibration portion 210_a_ illustrated in FIG. 5A, the plurality of first portions 210_a_1 and the plurality of second portions 210_a_2 can be disposed (e.g., arranged) in parallel on the same plane (e.g., the same layer). Each of the plurality of second portions 210_a_2 can be configured to fill a gap between two adjacent first portions 210_al_, and thus, each of the plurality of second portions 210_a_2 can be connected to or attached on an adjacent first portion 210_a_. Accordingly, the vibration portion 210_a_ can extend by a desired size or length on the basis of lateral coupling (e.g., connection) of the first portion 210_a_1 and the second portion 210_a_2.

In the vibration portion 210_a_ illustrated in FIG. 5A, the width W2 of each of the plurality of second portions 210_a_2 can decrease progressively in a direction from a center portion of the vibration portion 210*a* or the vibration apparatus to both edge portions (e.g., both sides or both ends) thereof.

According to an embodiment of the present disclosure, a second portion 210*a*2, having a largest width W2 among the plurality of second portions 210*a*2, can be located at a portion at which a highest stress can concentrate when the vibration portion 210*a* or the vibration apparatus is vibrating in a vertical direction Z (e.g., a thickness direction). A second portion 210*a*2, having a smallest width W2 among the plurality of second portions 210*a*2, can be located at a portion where a relatively low stress can occur when the vibration portion 210*a* or the vibration apparatus is vibrating in the vertical direction Z. For example, the second portion 210*a*2, having the largest width W2 among the plurality of second portions 210*a*2, can be disposed at the center portion of the vibration portion 210*a*, and the second portion 210*a*2, having the smallest width W2 among the plurality of second portions 210*a*2 can be disposed at each of both peripheries of the vibration portion 210*a*. Therefore, when the vibration portion 210*a* or the vibration apparatus is vibrating in the vertical direction Z, interference of a sound wave or overlapping of a resonance frequency, each occurring in the portion on which the highest stress concentrates, can be reduced or minimized. Thus, dip phenomenon of a sound pressure level occurring in the low-pitched sound band can be reduced, thereby improving flatness of a sound characteristic in the low-pitched sound band. The dip phenomenon can be an acoustic phenomenon of low-frequency band attenuation that occurs in the music halls when the sound of the music passes at a near grazing incidence over the seats, for instance. For example, flatness of a sound characteristic can be a level of a deviation between a highest sound pressure level and a lowest sound pressure level.

In the vibration portion 210*a* illustrated in FIG. 5A, the plurality of first portions 210*a*1 can have different sizes (e.g., widths). For example, a size (e.g., a width) of each of the plurality of first portions 210*a*1 can decrease or increase progressively in a direction from the center portion of the vibration portion 210*a* or the vibration apparatus to both edge portions (e.g., both sides or both ends) thereof. Therefore, a sound pressure level characteristic of a sound of the vibration portion 210*a* can be enhanced by various unique vibration frequencies based on vibrations of the plurality of first portions 210*a*1 having different sizes, and a reproduction band of a sound can extend.

Each of the plurality of second portions 210*a*2 can be disposed between the plurality of first portions 210*a*1. Therefore, in the vibration portion 210*a* or the vibration device 210, vibration energy based on a link in a unit lattice of the first portion 210*a*1 can be increased by the second portion 210*a*2, and thus, a vibration characteristic can increase and a piezoelectric characteristic and flexibility can be secured. For example, the second portion 210*a*2 can include one of an epoxy-based polymer, an acrylic-based polymer, and a silicone-based polymer, but embodiments of the present disclosure are not limited thereto.

Each of the plurality of second portions 210*a*2 according to an embodiment of the present disclosure can be configured with an organic material portion. For example, the organic material portion can be disposed between two adjacent inorganic material portions, and thus, can absorb an impact applied to the inorganic material portion (e.g., the first portion) and can release a stress concentrating on the inorganic material portion, thereby enhancing the durability of the vibration portion 210*a* or the vibration device 210 and realizing the flexibility of the vibration portion 210*a* or the vibration device 210.

The second portion 210*a*2 according to an embodiment of the present disclosure can have a modulus and viscoelasticity that are lower than those of the first portion 210*al*, and thus, the second portion 210*a*2 can enhance the reliability of the first portion 210*a*1 vulnerable to an impact due to a fragile characteristic of the first portion 210*a*1. For example, the second portion 210*a*2 can include a material having a loss coefficient of about 0.01 to about 1 and a modulus of about 0.1 [GPa] to about 10 [GPa].

The organic material portion included in the second portion 210*a*2 can include an organic material, an organic polymer, an organic piezoelectric material, or an organic non-piezoelectric material having a flexible characteristic compared to the inorganic material portion which is the first portion 210*a*1. For example, the second portion 210*a*2 can be referred to as an adhesive portion, a flexible portion, a bending portion, a damping portion, or a ductile portion, or the like, but embodiments of the present disclosure are not limited thereto.

The plurality of first portions 210*a*1 and the plurality of second portions 210*a*2 can be disposed on (e.g., connected to) the same plane, and thus, the vibration portion 210*a* according to an embodiment of the present disclosure can have a single thin film form. For example, the vibration portion 210*a* can have a structure where the plurality of first portions 210*a*1 are connected to one side thereof. For example, the vibration portion 210*a* can have a structure where the plurality of first portions 210*a*1 are connected in all of the vibration portion 210*a*. For example, the vibration portion 210*a* can be vibrated in a vertical direction with respect to the display panel or the vibration member by the first portion 210*a*1 having a vibration characteristic and can be bent in a curved shape by the second portion 210*a*2 having flexibility. Also, in the vibration portion 210*a* according to an embodiment of the present disclosure, a size of the first portion 210*a*1 and a size of the second portion 210*a*2 can be adjusted based on a piezoelectric characteristic and flexibility needed for the vibration portion 210*a* or the vibration device 210. For example, in the vibration portion 210*a* requiring a piezoelectric characteristic rather than flexibility, a size of the first portion 210*a*1 can be adjusted (or produced) to be greater than that of the second portion 210*a*2. In another embodiment of the present disclosure, in the vibration portion 210*a* requiring flexibility rather than a piezoelectric characteristic, a size of the second portion 210*a*2 can be adjusted (or produced) to be greater than that of the first portion 210*a*1. Accordingly, a size of the vibration portion 210*a* can be adjusted based on a desired characteristic, and thus, the vibration portion 210*a* can be easily designed.

With reference to FIG. 5B, a vibration portion 210*a* according to another embodiment of the present disclosure can include a plurality of first portions 210*al*, which are apart from one another in a first direction X and a second direction Y, and a second portion 210*a*2 disposed between the plurality of first portions 210*a*1.

The plurality of first portions 210*a*1 can be arranged apart from one another in each of the first direction X and the second direction Y. For example, the plurality of first portions 210*a*1 can be arranged in a lattice form to have a hexahedral shape having the same size. Each of the plurality of first portions 210*a*1 can include substantially the same piezoelectric material as that of the first portion 210*a*1 described above with reference to FIG. 5A, and thus, like reference numerals refer to like elements and repeated descriptions thereof are omitted.

The second portion **210*a*2 can be arranged between the plurality of first portions 210*a*1 in each of the first direction X and the second direction Y. The second portion 210*a*2 can be configured to fill a gap between two adjacent first portions 210*a*1 or surround each of the plurality of first portions 210*al*, and thus, can be connected or adhered to an adjacent first portion 210*a*1. According to an embodiment of the present disclosure, a width of the second portion 210*a*2 disposed between two first portions 210*a*1 adjacent to each other in the first direction X can be the same as or different from that of the first portion 210*a*1, and a width of the second portion 210*a*2 disposed between two first portions 210*a*1 adjacent to each other in the second direction Y can be the same as or different from that of the first portion 210*a*1. The second portion 210*a*2 can include substantially the same piezoelectric material as that of the second portion 210*a*2 described above with reference to FIG. 5**A, and thus, like reference numerals refer to like elements and repeated descriptions thereof are omitted.

As described above, the vibration portion **210*a* according to another embodiment of the present disclosure can have a 1-3 composite structure having a piezoelectric characteristic of a 1-3 vibration mode, and thus, can have a resonance frequency of 30 MHz or less, but embodiments of the present disclosure are not limited thereto. For example, the resonance frequency of the vibration portion 210*a*** can vary based on one or more of a shape, a length, and a thickness.

According to another embodiment of the present disclosure, each of the plurality of first portions **210*a*1 can have a planar structure having a circular shape. For example, each of the plurality of first portions 210*a*1 can have a circular plate shape, but embodiments of the present disclosure are not limited thereto. For example, each of the plurality of first portions 210*a*1** can have a dotted shape including an oval shape, a polygonal shape, or a donut shape.

According to another embodiment of the present disclosure, each of the plurality of first portions **210*a*1 can have a planar structure having a triangular shape. For example, each of the plurality of first portions 210*a*1 can have a triangular plate shape. According to another embodiment of the present disclosure, each of the plurality of first portions 210*a*1 can have a planar structure having a triangular shape. For example, each of the plurality of first portions 210*a*1** can have a triangular plate shape.

Therefore, the plurality of first portions **210*a*1 and the plurality of second portions 210*a*2 can be disposed on (e.g., connected to) the same plane, and thus, the vibration portion 210*a* according to an embodiment of the present disclosure can have a single thin film form. For example, the vibration portion 210*a* can have a structure where the plurality of first portions 210*a*1 are connected to one side thereof. For example, the vibration portion 210*a* can have a structure where the plurality of first portions 210*a*1 are connected in all of the vibration portion 210*a*. For example, the vibration portion 210*a* can be vibrated in a vertical direction with respect to the display panel or the vibration member by the first portion 210*a*1 having a vibration characteristic and can be bent in a curved shape by the second portion 210*a*2 having flexibility. Also, in the vibration portion 210*a* according to an embodiment of the present disclosure, a size of the first portion 210*a*1 and a size of the second portion 210*a*2 can be adjusted based on a piezoelectric characteristic and flexibility needed for the vibration portion 210*a* or the vibration device 210. For example, in the vibration portion 210*a* requiring a piezoelectric characteristic rather than flexibility, a size of the first portion 210*a*1 can be adjusted to be greater than that of the second portion 210*a*2. In another embodiment of the present disclosure, in the vibration portion 210*a* requiring flexibility rather than a piezoelectric characteristic, a size of the second portion 210*a*2 can be adjusted to be greater than that of the first portion 210*a*1. Accordingly, a size of the vibration portion 210*a* can be adjusted based on a desired characteristic, and thus, the vibration portion 210*a*** can be easily designed.

Figure 6:
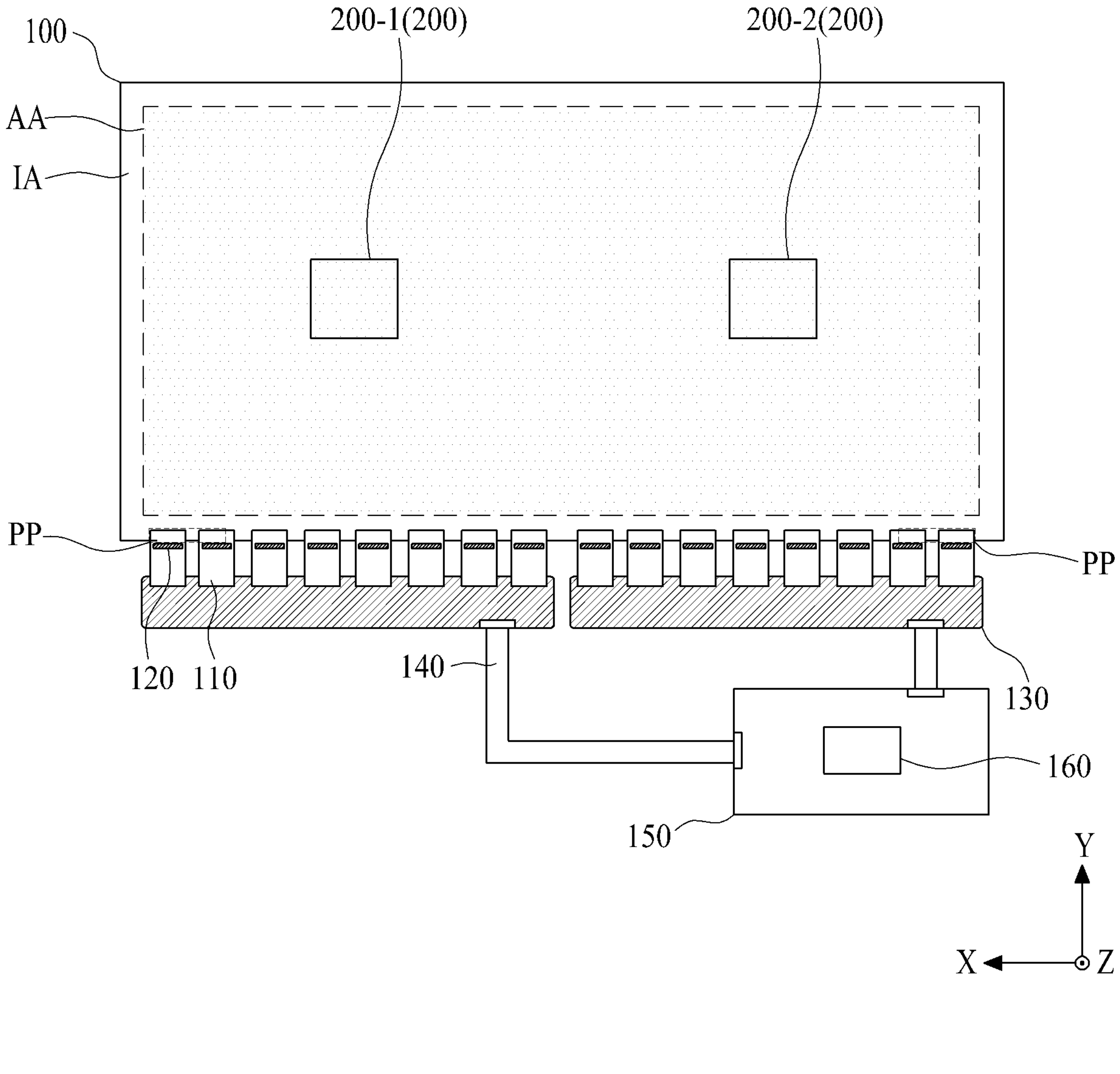
FIG. 6 illustrates a rear surface of a display panel according to an embodiment of the present disclosure.

FIG. 6 illustrates a rear surface of a display panel according to an embodiment of the present disclosure.

With reference to FIG. 6, a display apparatus according to an embodiment of the present disclosure can include a display panel (e.g., vibration member) 100, a gate driver, a data flexible circuit film 110, a data driving integrated circuit (IC) 120, a printed circuit board (PCB) 130, a signal cable 140, a control board 150, and a timing controller 160.

The display panel 100 can include a display area AA which includes a plurality of pixels provided in a substrate and a non-display area IA which surrounds the display area AA. The plurality of pixels can be respectively provided in a plurality of pixel areas which are defined a plurality of gate lines, a plurality of data lines intersecting with the plurality of gate lines, and a plurality of sensing lines parallel to the plurality of data lines.

Each of data flexible circuit films 110 can be attached on the display panel 100. Each data flexible circuit film 110 can be implemented as a tape carrier package (TCP) or a chip on film (COF or chip on flexible board). Each data flexible circuit film 110 can be attached on a corresponding pad portion of pad portions PP provided in the display panel 100 through a film attachment process using a conductive anisotropic film. Here, the film attachment process can use a tape automated bonding (TAB) process.

Each pad portion PP can be provided in an upper non-display area IA or a lower non-display area IA, which is adjacent to one end of each of the plurality of data lines, of the non-display area IA and can be electrically connected to the one end of the plurality of data lines.

According to an embodiment of the present disclosure, the display panel 100 can further include the gate driver which is provided in the non-display area IA of the display panel 100, and the gate driver can be provided as a gate embedded circuit. The gate driver can be electrically connected to one end of each of the plurality of gate lines. The gate driver can generate a gate signal in response to a gate control signal input through a gate control signal line formed in the display panel 100 and can supply the gate signal to predetermined gate lines.

Each of data driving ICs 120 can be mounted on a corresponding data flexible circuit film 110. Each data driving IC 120 can be connected to a data line, a pixel driving power line, and a sensing line through a corresponding data flexible circuit film 110 and a corresponding pad portion PP.

Each data driving IC 120 according to an embodiment of the present disclosure can supply a data voltage Vdata and a reference voltage Vref to each pixel, sense the threshold voltage and mobility characteristic variation of a driving transistor Tdr included in each pixel through the sensing line, and output a sensing value of the driving transistor Tdr to the outside. To this end, each data driving IC 120 according to an embodiment can include a data driver and a sensing unit.

The PCB 130 can be attached on the data flexible circuit film 110 in common through a film attachment process using a conductive anisotropic film. The PCB 130 can transfer a signal, input from the outside, to the data flexible circuit film 110.

The PCB 130 according to an embodiment of the present disclosure can include a first PCB, which is attached on a data flexible circuit films 110 disposed at a left portion among the data flexible circuit films 110, and a second PCB which is attached on a data flexible circuit films 110 disposed at a right portion among the data flexible circuit films 110, but embodiments of the present disclosure are not limited thereto. The data flexible circuit film 110 can be provided in plurality.

The control board 150 can be connected to the PCB 130 through the signal cable 140. The control board 150 according to an embodiment of the present disclosure can be connected to the first PCB through a first signal cable and can be connected to the second PCB through a second signal cable. The control board 150 can provide the timing controller 160 with a signal supplied from an external host system and can transfer a signal, output from the timing controller 160, to the PCB 130.

The timing controller 160 can be mounted on the control board 150 and can be supplied with a timing synchronization signal and video data from an external host system.

The timing controller 160 according to an embodiment can generate each of a gate control signal and a data control signal for the data driving IC 120 and the gate driver on the basis of the timing synchronization signal including a vertical synchronization signal, a horizontal synchronization signal, a data enable signal, and a main clock signal. Here, the gate control signal can include at least one gate start signal, a plurality of gate shift clocks, a plurality of gate carry clocks, and at least one reset clock. Also, the data control signal can include a source start signal, a source shift clock, and a source output enable signal.

The timing controller 160 according to an embodiment can generate a compensation value for compensating for a characteristic variation of a driving transistor Tdr of each pixel on the basis of the threshold voltage and mobility characteristic variation of the driving transistor Tdr of each pixel supplied from a sensing unit of the data driving IC 120, reflect the compensation value in pixel-based digital data, and provide the reflected compensation value to a corresponding data driving IC 120.

Figure 7A:
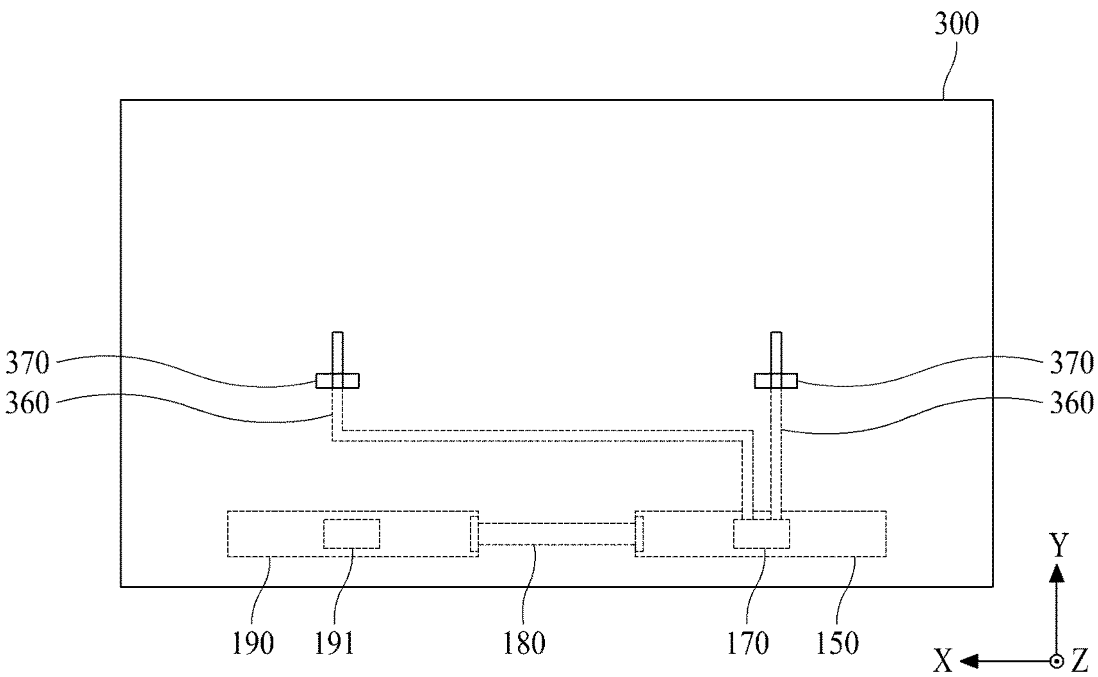
FIG. 7A illustrates a front surface of a supporting member according to an embodiment of the present disclosure.
Figure 7B:
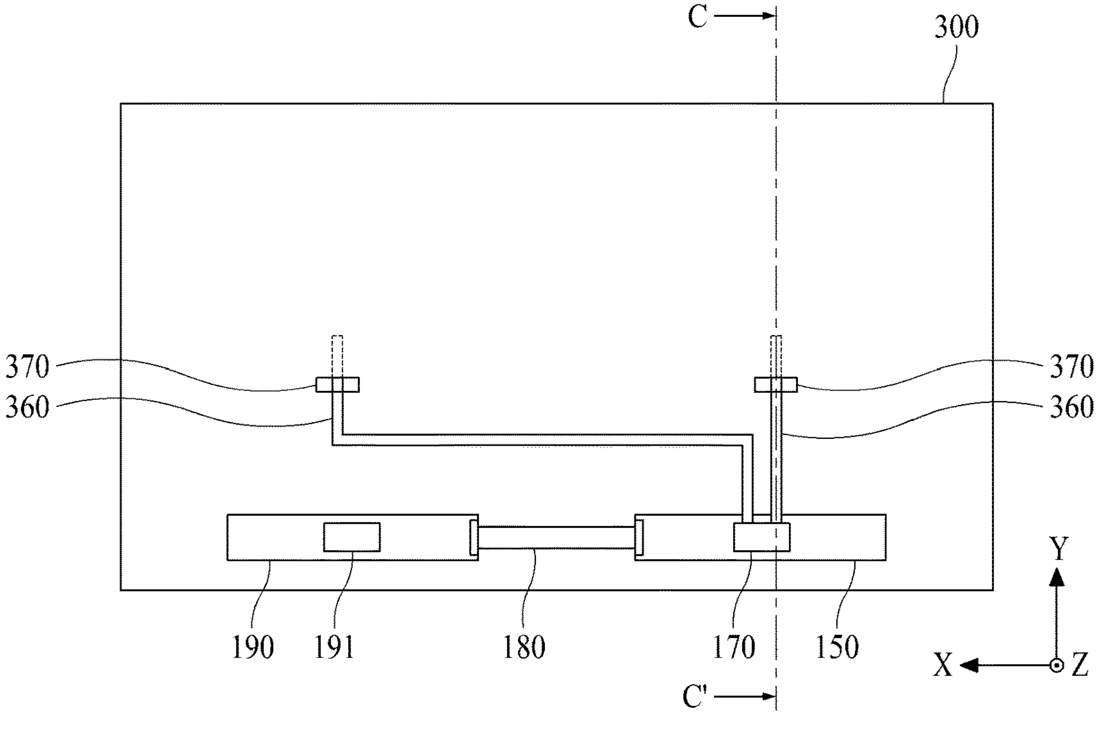
FIG. 7B illustrates a rear surface of a supporting member according to an embodiment of the present disclosure.
Figure 7C:
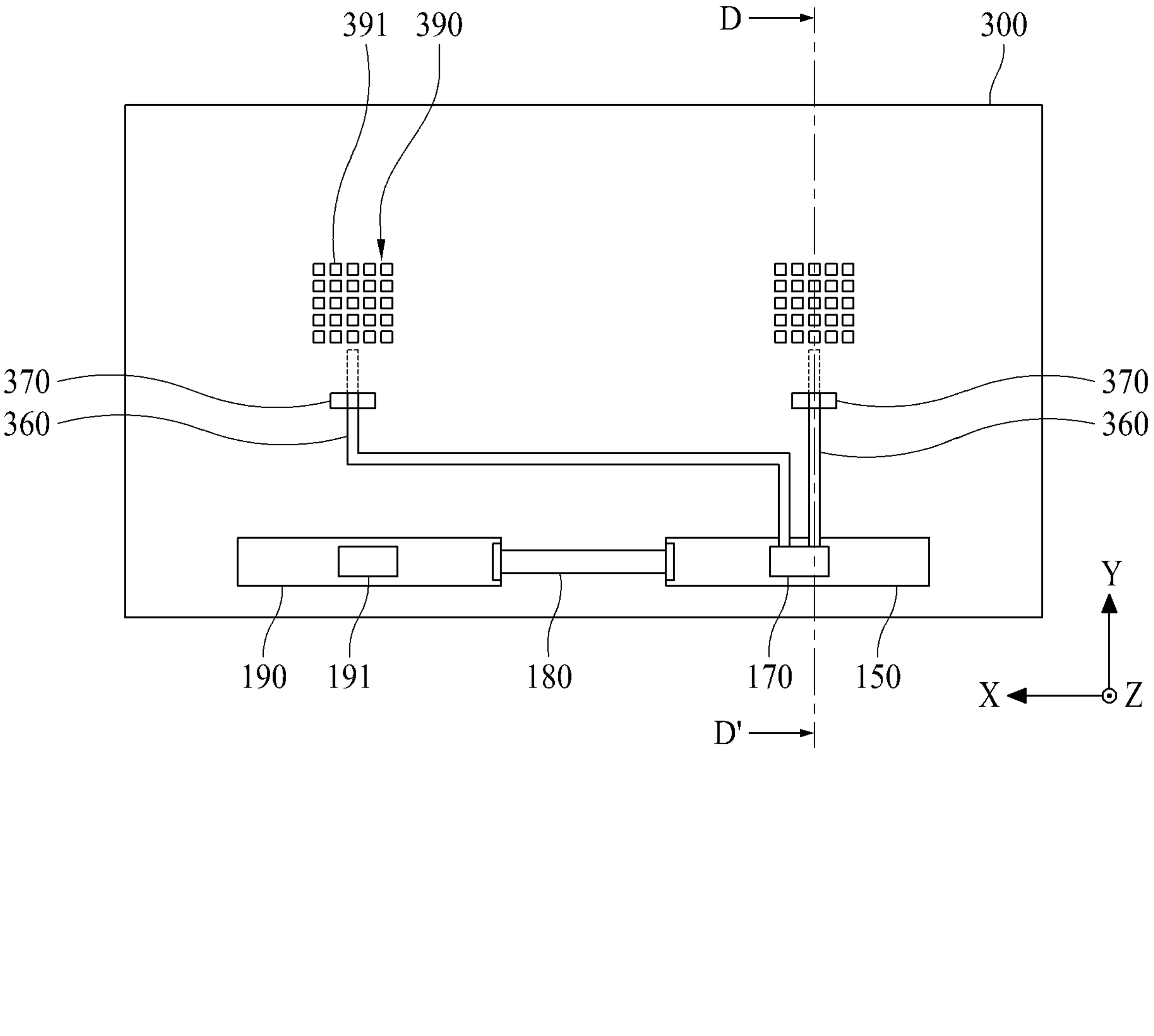
FIG. 7C illustrates a rear surface of a supporting member according to an embodiment of the present disclosure.

The control board 150 of FIG. 6 can be the same element as a circuit board 150 illustrated in FIGS. 7A to 7C, and the data flexible circuit film 110, the data driving IC 120, the PCB 130, the signal cable 140, the control board 150, and the timing controller 160 can be coupled to the supporting member 300 in a form where the data flexible circuit film 110 is folded by 180 degrees toward the display panel 100. However, the data flexible circuit film 110 can be folded by any number of degrees toward the display panel 100. The data flexible circuit film 110, the data driving IC 120, the PCB 130, the signal cable 140, the control board 150, and the timing controller 160 can be disposed on a rear surface of the supporting member 300 or on a front surface of the supporting member.

FIG. 7A illustrates a front surface of a supporting member according to an embodiment of the present disclosure, FIG. 7B illustrates a rear surface of a supporting member according to an embodiment of the present disclosure, and FIG. 7C illustrates a rear surface of a supporting member according to an embodiment of the present disclosure.

In FIGS. 7A to 7C, the illustration of an element by a solid line can denote that an element is disposed on a front surface in a case where the front surface of a supporting member 300 is illustrated and an element is disposed on a rear surface in a case where the rear surface is illustrated, and the illustration of an element by a dotted line can denote that an element is disposed on the rear surface in a case where the front surface of the supporting member 300 is illustrated and an element is disposed on the front surface in a case where the rear surface is illustrated.

With reference to FIGS. 7A to 7C, a supporting member 300 according to an embodiment of the present disclosure can include a vibration signal cable 360 where a portion thereof is mounted on a first surface or a front surface of the supporting member 300, a supporting member opening portion 370 which is formed in at least a portion of the supporting member 300, a control board 150 which is disposed on a second surface or a rear surface of the supporting member 300, and an audio controller 170, a power board 190, and a voltage generator 191 which are mounted on the control board 150.

The vibration signal cable 360 can be disposed to communicate from the first surface of the supporting member 300 to the second surface thereof through the supporting member opening portion 370, a portion of the vibration signal cable 360 can be disposed on the first surface or the front surface of the supporting member 300, and the other portion of the vibration signal cable 360 can be mounted on the second surface or the rear surface of the supporting member 300 and can be disposed in the supporting member opening portion 370.

The supporting member opening portion 370 can be formed to pass through the first surface and the second surface of the supporting member 300, as shown in FIGS. 7A and 7B. A position of the supporting member opening portion 370 is not limited thereto, and the supporting member opening portion 370 can be formed at a desired arbitrary position in terms of design, such as the position setting of the control board 150 of a display apparatus. For example, the supporting member opening portion 370 can be formed at a position which is relatively adjacent to the audio controller 170, and as described below with reference to FIG. 10A, the supporting member opening portion 370 can be formed at a position adjacent to a vibration generating apparatus.

According to an embodiment of the present disclosure, one end (e.g., a first end) of the vibration signal cable 360 can be connected to the audio controller 170 at the rear surface of the supporting member 300, and the other end (e.g., a second end) of the vibration signal cable 360 can be disposed on the front surface of the supporting member 300 and can be electrically connected to the vibration apparatus 200 by using a conductive connection member 500 described below.

The audio controller 170 can supply an alternating current (AC) voltage or an AC signal and an audio signal, supplied from the timing controller 160, to the vibration apparatus 200 through the below-described vibration signal cable 360 in a driving period or a vibration generating period of the vibration apparatus 200, and the AC signal can be a vibration driving signal, a sound driving signal, and a haptic driving signal of the vibration apparatus 200. Alternatively, driving of the audio controller 170 may not be controlled by the timing controller 160 and can be controlled to be supplied with an audio signal from a separate sound processing circuit. In a case where an operation of the audio controller 170 is controlled by the timing controller 160, a structure where the sound processing circuit is mounted on or integrated into the timing controller 160 can be implemented. Here, the audio controller 170 can be referred to as an audio circuit, an audio amplifier circuit, an audio amplifier, or an audio amplifier unit, but the terms are not limited thereto.

For example, the audio controller 170 can amplify and output each of a positive audio signal and a negative audio signal and each of a positive vibration driving signal and a negative vibration driving signal on the basis of a predetermined gain value or a gain value adjusted by the timing controller 160.

The voltage generator 191 can be mounted on the power board 190 and can generate and output various voltages for displaying an image on each pixel of the display panel 100 and for driving the timing controller 160, the data driving IC 120, and the gate driver 200, on the basis of an input power supplied thereto. Also, the voltage generator 191 can supply a direct current (DC) voltage to the below-described audio controller 170. The power board 190 can be connected to the control board 150 through the signal cable 180.

A supporting member duct 390 can be formed to pass through the first surface and the second surface and can be formed at a position corresponding to or overlapping the vibration apparatus 200 on a rear surface of the display panel 100. The supporting member duct 390 can enable the smooth flow of an air layer (e.g., air flow) which is affected by driving of the vibration apparatus 200 or is disposed between the display panel 100 and the supporting member 300, and the resonance and echo of sound can occur through the supporting member duct 390 and the air layer between the display panel 100 and the supporting member 300, thereby enhancing a sound characteristic of the vibration apparatus 200 (for example, a sound characteristic of a low-pitched sound band).

To provide description with reference to FIGS. 6 and 7A to 7C, in a structure of a display apparatus where the display panel 100 is coupled to the supporting member 300, the other end of the vibration signal cable 360 disposed on the front surface of the supporting member 300 can be disposed to overlap at least a portion of the vibration apparatus 200, and for example, the other end of the vibration signal cable 360 disposed on the front surface of the supporting member 300 can be disposed to overlap at least a portion of each of first and second power supply lines PL1 and PL2 of the vibration apparatus 200 described below or a pad portion of the vibration apparatus 200.

Figure 8A:
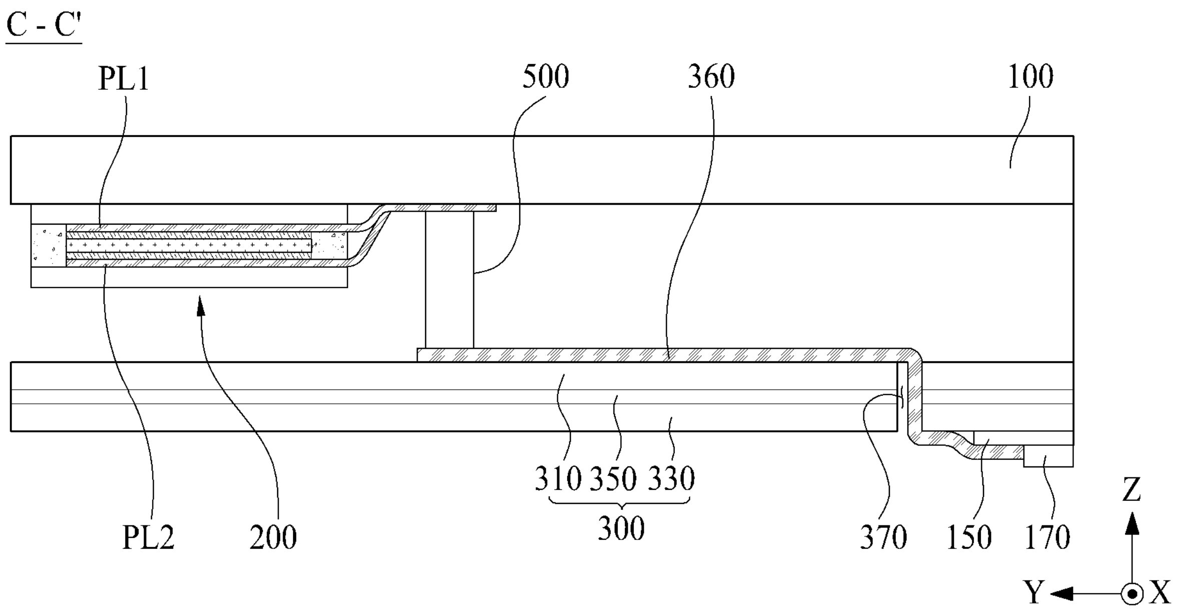
FIG. 8A is a cross-sectional view taken along line C-C' of FIG. 7B.
Figure 8B:
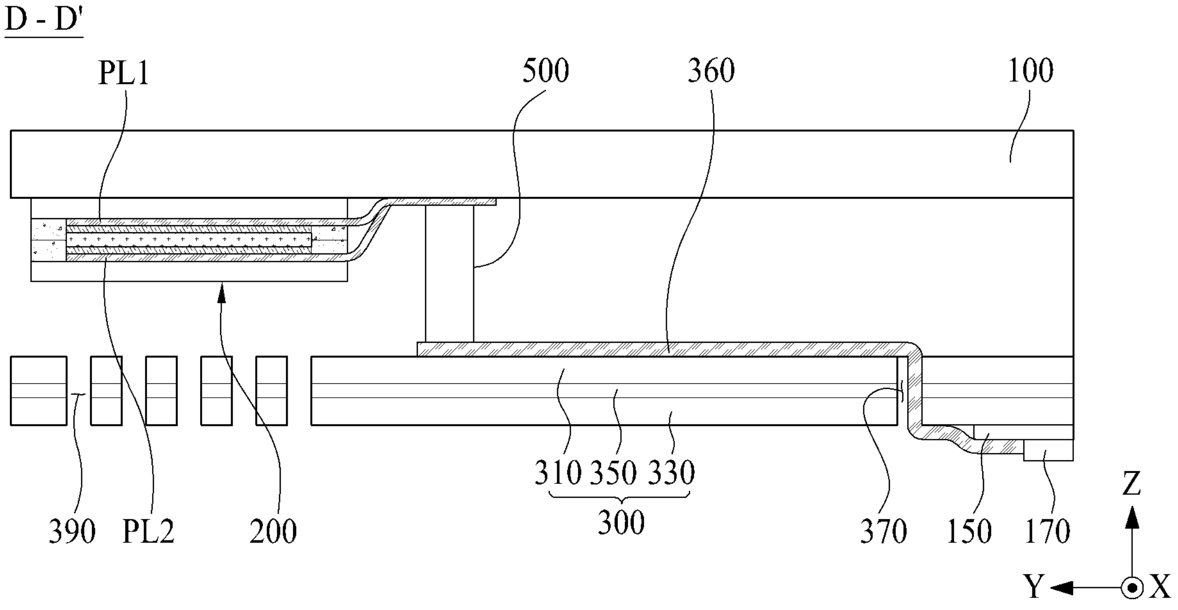
FIG. 8B is a cross-sectional view taken along line D-D' of FIG. 7C.

FIG. 8A is a cross-sectional view taken along line C-C' of FIG. 7B, and FIG. 8B is a cross-sectional view taken along line D-D' of FIG. 7C.

In the cross-sectional views of FIGS. 8A and 8B, for convenience of description, the first and second power supply lines PL1 and PL2 are illustrated as overlapping in a region contacting a conductive connection member 500, but as described above with reference to FIG. 3, the first and second power supply lines PL1 and PL2 can be disposed apart from each other in a horizontal direction or a first direction X. However, the first and second power supply lines PL1 and PL2 can be disposed apart from each other in a horizontal direction or a first direction X With reference to FIGS. 8A and 8B, one end of the conductive connection member 500 can be connected to each of the first and second power supply lines PL1 and PL2, and the other end of the conductive connection member 500 can be connected to the audio controller 170. For example, the first and second power supply lines PL1 and PL2 of the vibration apparatus 200 can be provided to protrude to the outside of the vibration apparatus 200, the conductive connection member 500 can be provided as at least a pair of conductive connection members 500, one conductive connection member 500 can contact the first power supply line PL1 electrically connected to the first electrode portion 210*b*, and the other conductive connection member 500 can contact the second power supply line PL2 electrically connected to the second electrode portion 210*c*.

Alternatively, when the vibration apparatus 200 has a structure where the first and second power supply lines PL1 and PL2 do not protrude to the outside of the vibration apparatus 200, the conductive connection member 500 can contact the first and second power supply lines PL1 and PL2 to pass through at least a portion of the vibration apparatus 200.

For example, a physical and electrical contact between the conductive connection member 500 and each of the first and second power supply lines PL1 and PL2 and a physical and electrical contact between the conductive connection member 500 and the vibration signal cable 360 can be performed by applying a force in a third direction (a Z direction).

Figure 9A:
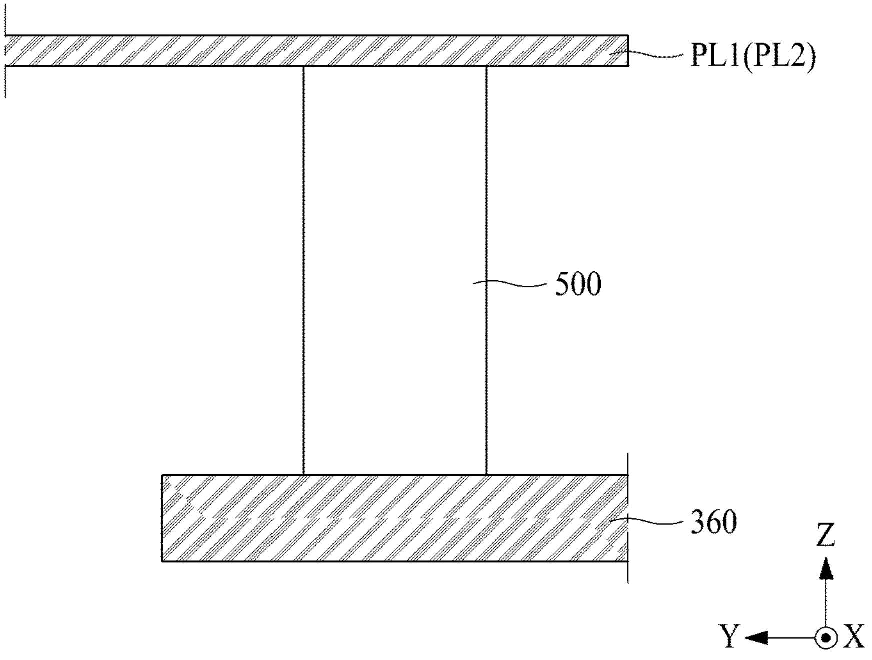
FIGS. 9A and 9B illustrate a connection structure between a power supply line, a conductive connection member, and a sound cable of a vibration apparatus according to an embodiment of the present disclosure.
Figure 9B:
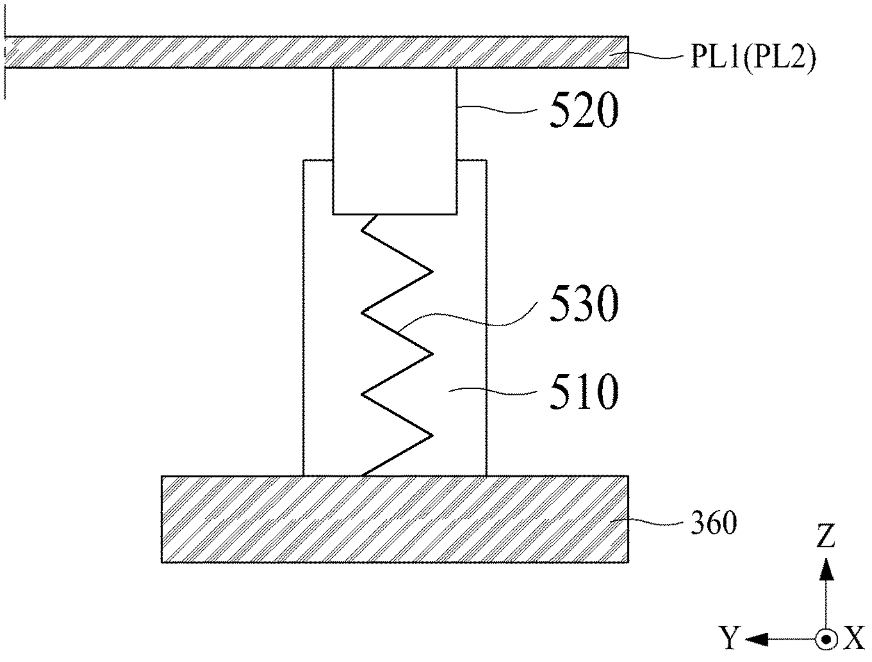

FIGS. 9A and 9B illustrate a connection structure between a power supply line, a conductive connection member, and a sound cable of a vibration apparatus according to an embodiment of the present disclosure.

With reference to FIG. 9A, a conductive connection member 500 according to an embodiment of the present disclosure can be disposed between first and second power supply lines PL1 and PL2 and a vibration signal cable 360 in a shape such as a cylindrical shape or a tetragonal pillar shape, one end of the conductive connection member 500 can contact the first and second power supply lines PL1 and PL2, and the other ends of the conductive connection member 500 can contact the vibration signal cable 360.

The conductive connection member 500 can include a material having electrical conductivity. The conductive connection member 500 can include metal having electrical conductivity, and for example, can include copper, nickel, aluminum, silver, gold, and an alloy thereof, but embodiments of the present disclosure are not limited thereto.

With reference to FIG. 9B, a conductive connection member 500 according to an embodiment of the present disclosure can include a housing 510, an elastic member 530 accommodated into the housing 510, and a contact member 520 where a certain portion thereof is moved by expansion and contraction of the elastic member 530, and the contact member 520 can be disposed at one end of the elastic member 530. The housing 510, the contact member 520, and the elastic member 530 can include metal having electrical conductivity, and for example, can include copper, nickel, aluminum, silver, gold, and an alloy thereof, but embodiments of the present disclosure are not limited thereto.

Figure 10A:
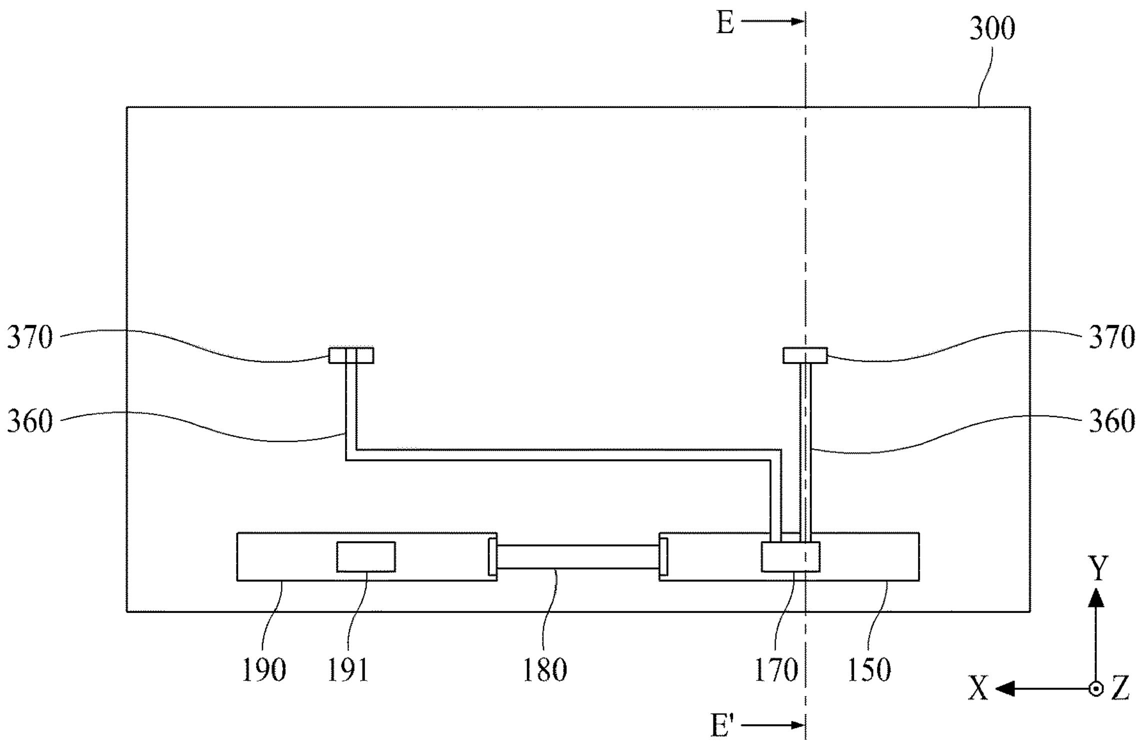
FIG. 10A illustrates a rear surface of a supporting member according to an embodiment of the present disclosure.
Figure 10B:
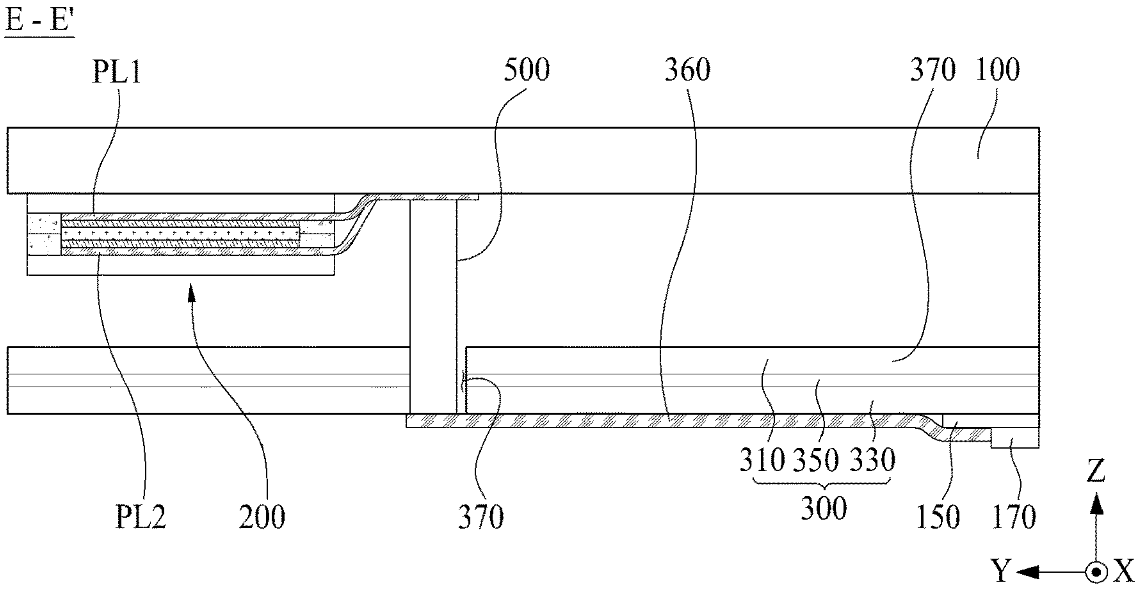
FIG. 10B is a cross-sectional view taken along line E-E' of FIG. 10A.

FIG. 10A illustrates a rear surface of a supporting member according to an embodiment of the present disclosure, and FIG. 10B is a cross-sectional view taken along line E-E' of FIG. 10A.

With reference to FIGS. 10A and 10B, a supporting member opening portion 370 can be provided at a side adjacent to a vibration apparatus 200, and in detail, can be provided to overlap at least a portion of each of first and second power supply lines PL1 and PL2 of the vibration apparatus 200.

Alternatively, unlike the illustration of FIG. 10B, in a case where the first and second power supply lines PL1 and PL2 of the vibration apparatus 200 have a structure which does not protrude to the outside of the vibration apparatus 200, the supporting member opening portion 370 can be provided to overlap at least a portion of the vibration apparatus 200, and for example, can be provided to overlap a pad portion 217 of the vibration apparatus 200.

When the supporting member opening portion 370 is provided at a side adjacent to the vibration apparatus 200 or is provided to overlap at least a portion of the vibration apparatus 200, a conductive connection member 500 can pass through the supporting member opening portion 370, one end of the conductive connection member 500 can contact the first and second power supply lines PL1 and PL2 of the vibration apparatus 200, and the other end of the conductive connection member 500 can contact a vibration signal cable 360.

When the supporting member opening portion 370 is provided at a side adjacent to the vibration apparatus 200 or is provided to overlap at least a portion of the vibration apparatus 200, the vibration signal cable 360 can be provided to be attached or mounted on only a second surface or a rear surface of a supporting member 300.

Figure 11A:
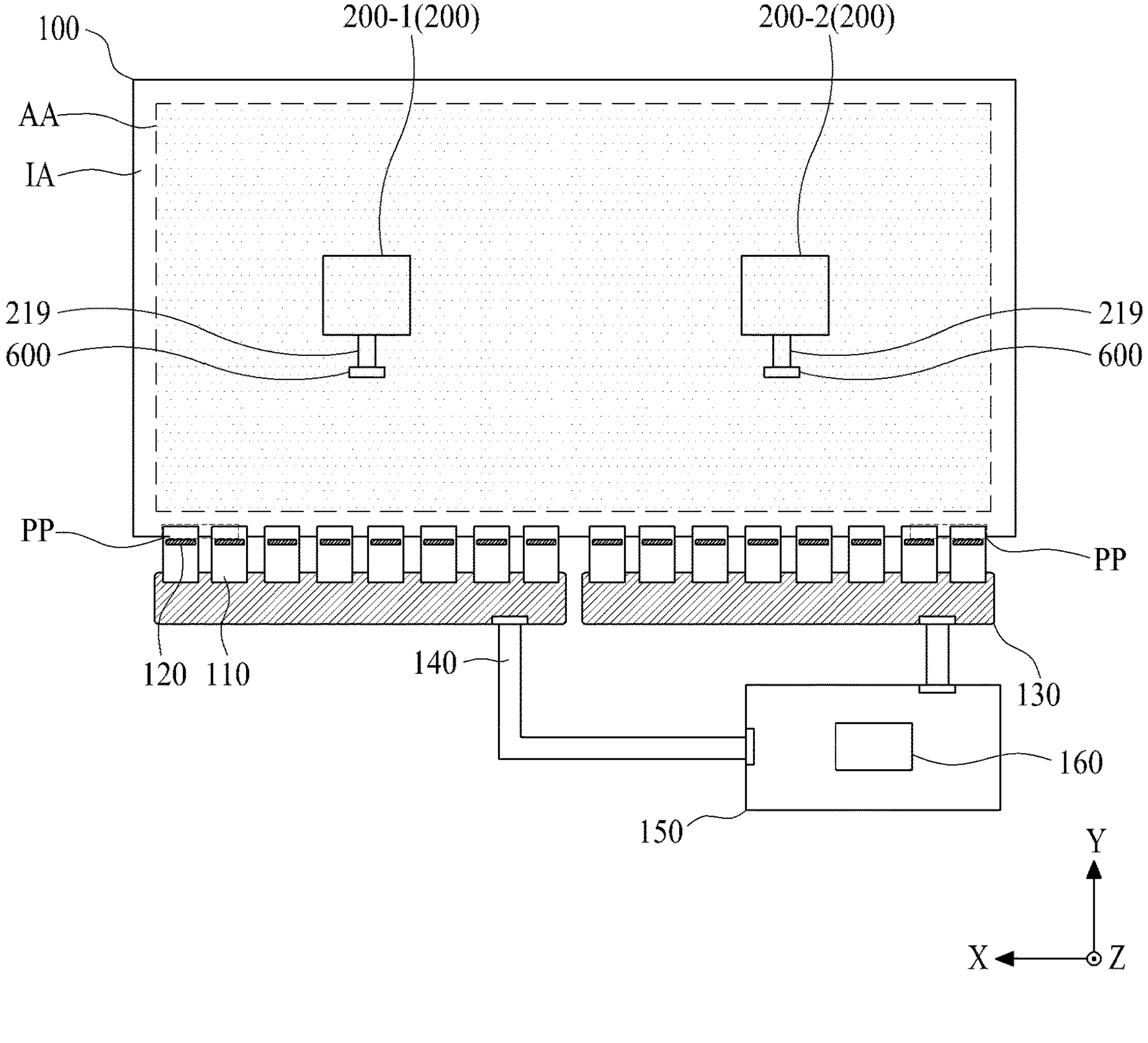
FIG. 11A illustrates a rear surface of a display panel according to an embodiment of the present disclosure.
Figure 11B:
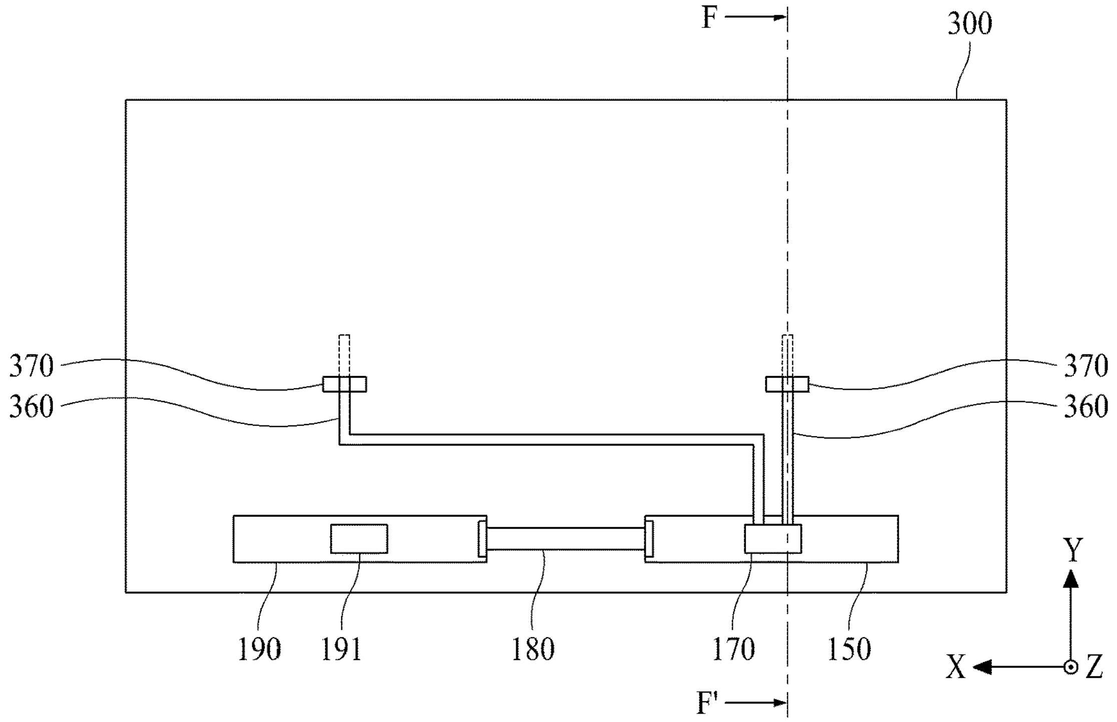
FIG. 11B illustrates a rear surface of a supporting member according to an embodiment of the present disclosure.
Figure 12:
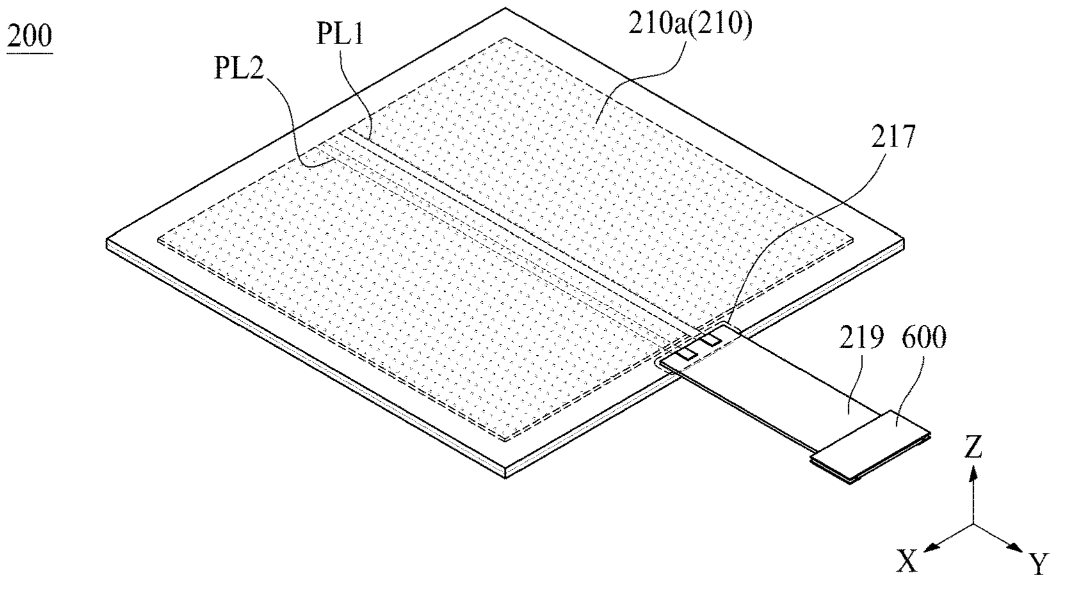
FIG. 12 is a perspective view of a fixing member of a vibration apparatus according to an embodiment of the present disclosure.

FIG. 11A illustrates a rear surface of a display panel according to an embodiment of the present disclosure, FIG. 11B illustrates a rear surface of a supporting member according to an embodiment of the present disclosure, and FIG. 12 is a perspective view of a fixing member of a vibration apparatus according to an embodiment of the present disclosure.

With reference to FIG. 11A, a vibration apparatus 200 according to an embodiment of the present disclosure can further include a signal cable and a structure portion which supports one surface of the signal cable.

The signal cable 219 can be electrically connected to a pad portion disposed in the vibration apparatus 200 and can supply the vibration apparatus 200 with a vibration driving signal (e.g., a sound signal) provided from a sound processing circuit. The signal cable 219 according to an embodiment of the present disclosure can include a terminal, and the terminal can be electrically connected to a pad electrode of the pad portion PP. For example, the signal cable 219 can be configured as a flexible cable, a flexible printed circuit cable, a flexible flat cable, a single-sided flexible printed circuit, a single-sided flexible printed circuit board, a flexible multilayer printed circuit, or a flexible multi-layer PCB, but embodiments of the present disclosure are not limited thereto. For example, the signal cable 219 can be configured to be transparent, semitransparent, or opaque.

Figure 13A:
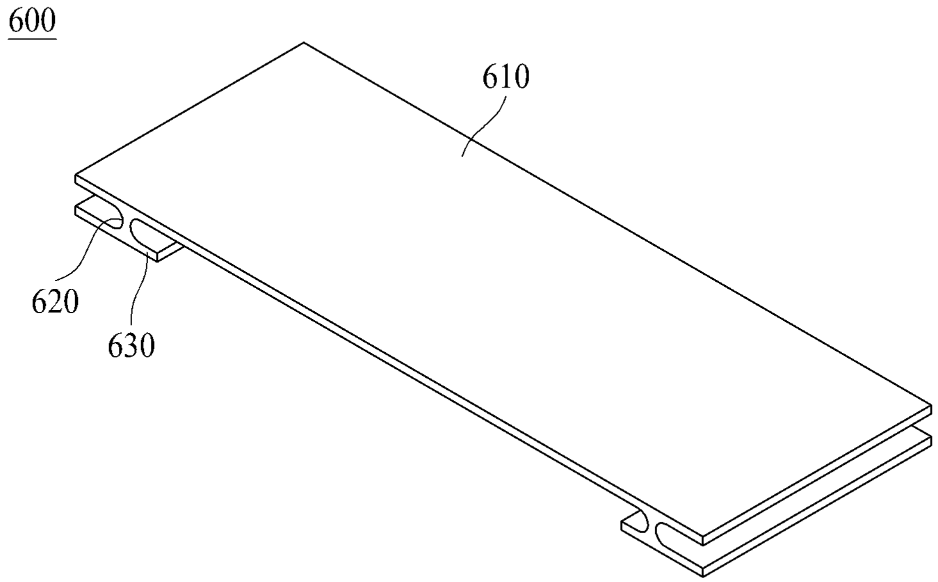
FIG. 13A is a perspective view of a fixing member according to an embodiment of the present disclosure.
Figure 13B:
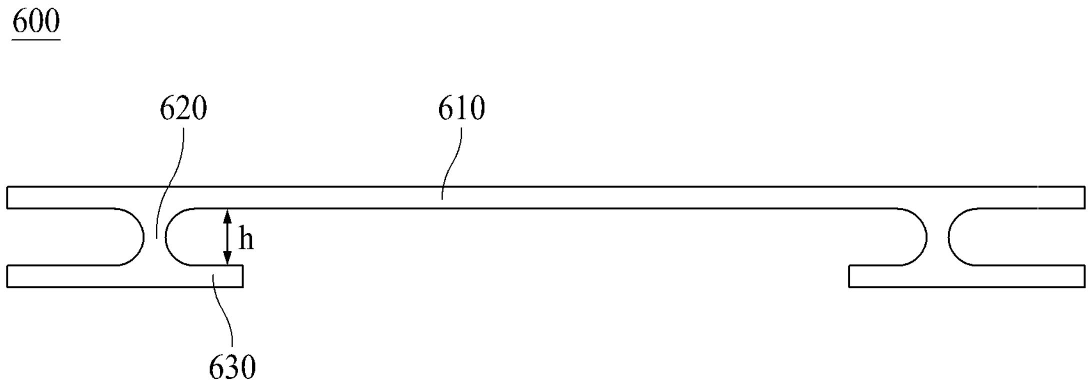
FIG. 13B is a cross-sectional view of a fixing member according to an embodiment of the present disclosure.

FIG. 12 is a perspective view of a fixing member of a vibration apparatus according to an embodiment of the present disclosure. FIG. 13A is a perspective view of a fixing member according to an embodiment of the present disclosure. FIG. 13B is a cross-sectional view of a fixing member according to an embodiment of the present disclosure.

With reference to FIGS. 12, 13A, and 13B, a fixing member 600 according to an embodiment of the present disclosure can include a supporting portion 610, a pillar portion 620, and a wing portion 630.

The fixing member 600 according to an embodiment of the present disclosure can be prepared through an injection process and can include a plastic material such as polycarbonate (PC).

The supporting portion 610 can provide a flat surface (e.g., planar surface) for contacting the signal cable 219 and the vibration signal cable 360. A first surface of the supporting portion 610 can be adjacent to a display panel 100, and a second surface thereof can support the signal cable 219.

A length "h" or an interval "h" of the pillar portion 620 can be adjusted to a thickness which is equal to or less than a thickness which is a sum of thicknesses of the signal cable 219 and the vibration signal cable 360, and thus, the signal cable 219 and the vibration signal cable 360 may not move after the signal cable 219 contacts the vibration signal cable 360, thereby preventing the signal cable 219 and the vibration signal cable 360 from being lost.

The wing portion 630 can provide certain flexibility and stiffness which enable the wing portion 630 to move, so that the vibration signal cable 360 is easily bonded to the signal cable 219 in a bonding process. The wing portion 630 can be provided to protrude to an inner portion and an outer portion of the pillar portion 620 with respect to pillar portion 620. For example, the wing portion 630 can have a greater width than the pillar portion 620, and the pillar portion 620 can be disposed at a longitudinal center of the pillar portion 620 or at a position spaced from the longitudinal center of the pillar portion 620.

Figure 14:
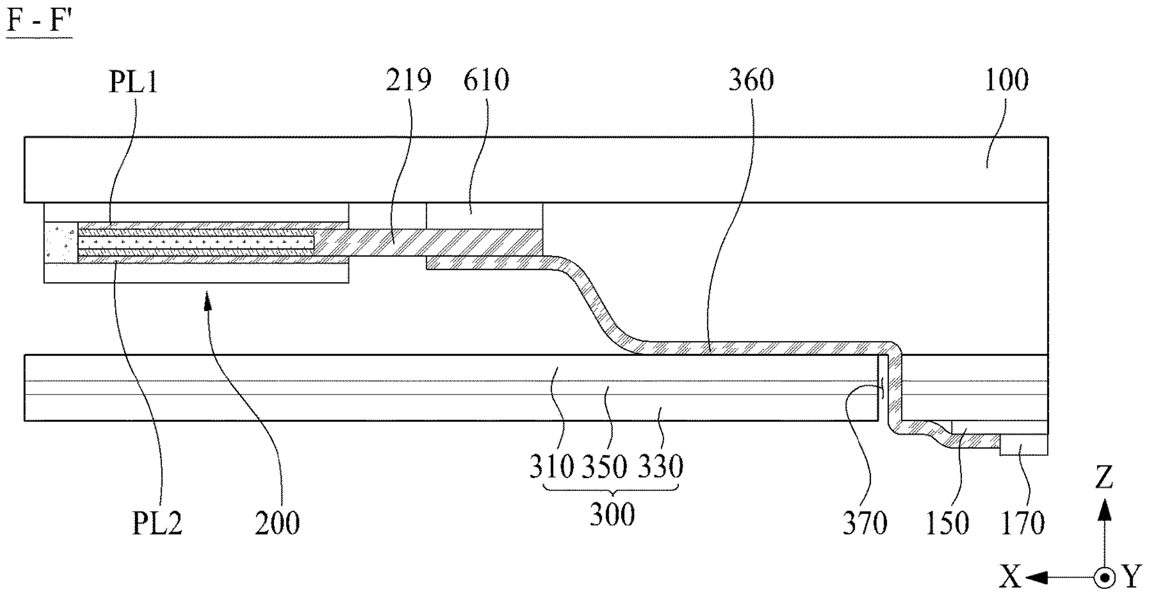
FIG. 14 is a cross-sectional view taken along line F-F' of FIG. 11B.

FIG. 14 is a cross-sectional view taken along line F-F' of FIG. 11B.

With reference to FIG. 14, each of the first power supply line PL1 and the second power supply line PL2 of the vibration apparatus 200 can contact the signal cable 219. The signal cable 219 can be fixed to the supporting portion 610 of the fixing member 600, and the signal cable 219 can contact the vibration signal cable 360, on the supporting portion 610. Here, the signal cable 219 can electrically contact the vibration signal cable 360 through only a physical contact. The vibration signal cable 360 can communicate with a second surface or a rear surface of the supporting member 300 through the supporting member opening portion 370 provided in at least a portion of the supporting member 300, and the vibration signal cable 360 can be connected to the audio controller 170 mounted on the control board 150 provided on the rear surface of the supporting member 300.

Figure 15:
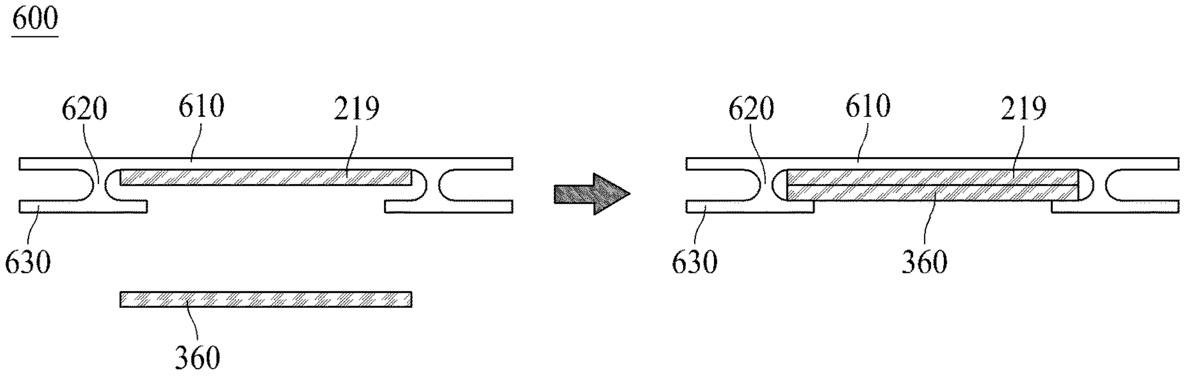
FIG. 15 illustrates an example where a signal cable contacts a vibration signal cable through a fixing member, in a vibration apparatus according to an embodiment of the present disclosure.

FIG. 15 illustrates an example where a signal cable contacts a vibration signal cable through a fixing member, in a vibration apparatus according to an embodiment of the present disclosure.

With reference to FIG. 15, a signal cable 219 and the vibration signal cable 360 can be supported by a second surface of a fixing member 600, a wing portion 630 can be provided to protrude to an inner portion and an outer portion with respect to the pillar portion 620, and the signal cable 219 can be fixed by the wing portion 630 so as not to be detached (e.g., be removably connected to the fixing member 600 by the wing portion 630 restricting vertical movement and the pillar portion 620 restricting longitudinal movement). The fixing member 600 as a whole is flexible, in order to allow the vibration signal cable 360 to be installed into the fixing member 600 by movement of the vibration signal cable 360 in a vertical direction. When the vibration signal cable 360 is pressed toward the signal cable 219 (e.g., in the vertical direction) through the wing portion 630, the vibration signal cable 360 can physically contact the signal cable 219 through the wing portion 630 having certain flexibility.

An apparatus according to various embodiments of the present disclosure will be described below.

An apparatus according to an embodiment of the present disclosure comprises a vibration member, a vibration apparatus disposed on a rear surface of the vibration member to vibrate the vibration member, a supporting member on a rear surface of the vibration apparatus, the supporting member including a first surface facing the vibration member and a second surface opposite to the first surface, a vibration signal cable disposed on the first surface or the second surface of the supporting member, and a conductive connection member electrically connecting the vibration apparatus to the vibration signal cable.

According to some embodiments of the present disclosure, the supporting member can include a supporting member opening portion through which the first surface of the supporting member and the second surface of the supporting member pass, the vibration signal cable passes through the supporting member opening portion, and the vibration signal cable is disposed on the first surface of the supporting member and the second surface of the supporting member.

According to some embodiments of the present disclosure, the vibration apparatus can include a vibration portion, a first electrode portion on a first surface of the vibration portion, and a second electrode portion on a second surface of the vibration portion.

According to some embodiments of the present disclosure, can further include a first power supply line connected to the first electrode portion, and a second power supply line connected to the second electrode portion.

According to some embodiments of the present disclosure, the conductive connection member can supply an AC power to the first power supply line and the second power supply line from the vibration signal cable.

According to some embodiments of the present disclosure, the supporting member can further include a supporting member duct overlapping the vibration apparatus.

According to some embodiments of the present disclosure, the supporting member can include a supporting member opening portion through which the first surface of the supporting member and the second surface of the supporting member pass, the supporting member opening portion can overlap each of the first power supply line and the second power supply line, and the conductive connection member can overlap each of the first power supply line and the second power supply line.

According to some embodiments of the present disclosure, can further include a control board disposed on a rear surface of the supporting member, and an audio controller mounted on the control board, the vibration signal cable can be connected to the audio controller.

According to some embodiments of the present disclosure, the conductive connection member can include a housing, an elastic member accommodated into the housing, a length of the elastic member varying, and a contact member connected to one end of the elastic member to move.

According to another embodiment of the present disclosure, an apparatus comprises a vibration member, a vibration apparatus disposed on a rear surface of the vibration member to vibrate the vibration member, a supporting member on a rear surface of the vibration apparatus, the supporting member including a first surface facing the vibration member and a second surface opposite to the first surface, and a vibration signal cable disposed on the first surface and the second surface of the supporting member, the vibration apparatus can further include a signal cable receiving a positive signal and a negative signal, and a fixing member fixing the signal cable to the vibration signal cable.

According to some embodiments of the present disclosure, the vibration apparatus can include a vibration portion, a first electrode portion on a first surface of the vibration portion, and a second electrode portion on a second surface of the vibration portion.

According to some embodiments of the present disclosure, can further include a first power supply line connected to the first electrode portion, and a second power supply line connected to the second electrode portion.

According to some embodiments of the present disclosure, the signal cable can be connected to each of the first power supply line and the second power supply line.

According to some embodiments of the present disclosure, the vibration signal cable can supply an AC power to the signal cable.

According to some embodiments of the present disclosure, the fixing member can include a supporting portion supporting the signal cable and the vibration signal cable, a wing portion preventing movement of the signal cable and the vibration signal cable, and a pillar portion connecting the supporting portion to the wing portion.

According to some embodiments of the present disclosure, can further include a control board disposed on a rear surface of the supporting member, and an audio controller mounted on the control board, the vibration signal cable can be connected to the audio controller.

According to some embodiments of the present disclosure, the vibration member can include a first region and a second region, and the vibration apparatus can include a first vibration apparatus disposed in the first region and a second vibration apparatus disposed in the second region.

According to some embodiments of the present disclosure, the vibration member can include a metal material, or can include a single nonmetal or composite nonmetal material including one or more of wood, rubber, plastic, glass, fiber, cloth, paper, and leather.

According to some embodiments of the present disclosure, the vibration member can include one or more of a display panel including a plurality of pixels displaying an image, a light emitting diode lighting panel, an organic light emitting diode lighting panel, and an inorganic light emitting diode lighting panel.

According to some embodiments of the present disclosure, the vibration member can include one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, metal, wood, rubber, plastic, glass, fiber, cloth, paper, leather, and mirror.

According to embodiments of the present disclosure, because a conductive supporting member is provided, the occurrence of a touch caused by a cable can be prevented, and thus, sound quality can be improved.

Moreover, according to embodiments of the present disclosure, because a vibration signal cable is mounted on a rear surface of a supporting member, the occurrence of heat can be prevented, and thus, there can be an effect of preventing the occurrence of heat.

Moreover, according to embodiments of the present disclosure, because positions of a fixing member and a supporting member opening are adjusted to various positions, the degree of freedom in design of an apparatus can be enhanced, and as the fixing member is provided, the stiffness and heat dissipation capability of an apparatus can be enhanced.

The present disclosure encompasses various modifications to each of the examples and embodiments discussed herein. According to the disclosure, one or more features described above in one embodiment or example can be equally applied to another embodiment or example described above. The features of one or more embodiments or examples described above can be combined into each of the embodiments or examples described above. Any full or partial combination of one or more embodiment or examples of the disclosure is also part of the disclosure.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

It will be apparent to those skilled in the art that various modifications and variations can be made in the present disclosure without departing from the technical idea or scope of the disclosures. Thus, it is intended that the present disclosure covers the modifications and variations of this disclosure provided they come within the scope of the appended claims and their equivalents.

What is claimed is:

1. An apparatus, comprising:
a vibration member;
a vibration apparatus disposed on the vibration member and configured to vibrate the vibration member;
a supporting member disposed on the vibration apparatus, the supporting member including a first surface facing the vibration member and a second surface opposite to the first surface;
a vibration signal cable at the first surface or the second surface of the supporting member; and
a conductive connection member electrically connecting the vibration apparatus to the vibration signal cable,
wherein the supporting member comprises an opening portion communicating with the first surface of the supporting member and the second surface of the supporting member,
wherein the vibration signal cable passes through the opening portion, and
wherein the vibration signal cable is disposed on the first surface of the supporting member and the second surface of the supporting member.

2. The apparatus of claim 1, wherein the vibration apparatus comprises:
a vibration portion;
a first electrode portion at a first surface of the vibration portion; and
a second electrode portion at a second surface of the vibration portion, the second surface of the vibration portion being opposite to the first portion of the vibration portion.

3. The apparatus of claim 2, further comprising:
a first power supply line connected to the first electrode portion; and
a second power supply line connected to the second electrode portion.

4. The apparatus of claim 3, wherein the conductive connection member supplies an alternating current (AC) power to the first power supply line and the second power supply line from the vibration signal cable.

5. The apparatus of claim 1, wherein the supporting member further comprises a duct overlapping the vibration apparatus to enable air flow and resonance therethrough.

6. The apparatus of claim 1, wherein the opening portion of the supporting member overlaps each of the first power supply line and the second power supply line, and
wherein the conductive connection member is connected to each of the first power supply line and the second power supply line.

7. The apparatus of claim 1, further comprising:
a control board disposed on the supporting member; and
an audio controller mounted on the control board,
wherein the vibration signal cable is connected to the audio controller.

8. The apparatus of claim 1, wherein the conductive connection member comprises:
a housing;
an elastic member accommodated into the housing; and
a contact member connected to an end of the elastic member to move.

9. An apparatus, comprising:
a vibration member;
a vibration apparatus disposed on the vibration member to vibrate the vibration member;
a supporting member disposed on the vibration apparatus, the supporting member including a first surface facing the vibration member and a second surface opposite to the first surface; and
a vibration signal cable provided at the first surface and the second surface of the supporting member,
wherein the vibration apparatus further comprises:
a signal cable receiving a positive signal and a negative signal; and
a fixing member fixing the signal cable to the vibration signal cable.

10. The apparatus of claim 9, wherein the vibration apparatus comprises:
a vibration portion;
a first electrode portion disposed at a first surface of the vibration portion; and
a second electrode portion disposed at a second surface of the vibration portion.

11. The apparatus of claim 10, further comprising:
a first power supply line connected to the first electrode portion; and
a second power supply line connected to the second electrode portion.

12. The apparatus of claim 11, wherein the signal cable is connected to each of the first power supply line and the second power supply line.

13. The apparatus of claim 10, wherein the vibration signal cable supplies an alternating current (AC) power to the signal cable.

14. The apparatus of claim 10, wherein the fixing member comprises:

a supporting portion configured to support the signal cable and the vibration signal cable;

a wing portion preventing movement of the signal cable and the vibration signal cable; and a pillar portion connecting the supporting portion to the wing portion.

15. The apparatus of claim 9, further comprising:

a control board disposed on the supporting member; and an audio controller mounted on the control board, wherein the vibration signal cable is connected to the audio controller.

16. The apparatus of claim 1, wherein the vibration member comprises a first region and a second region, and wherein the vibration apparatus comprises a first vibration apparatus disposed at the first region and a second vibration apparatus disposed at the second region.

17. The apparatus of claim 1, wherein the vibration member comprises a metal material, or comprises a single nonmetal or composite nonmetal material including one or more of wood, rubber, plastic, glass, fiber, cloth, paper, and leather.

18. The apparatus of claim 1, wherein the vibration member comprises one or more of:

a display panel including a pixel configured to display an image, a light emitting diode lighting panel, an organic light emitting diode lighting panel, an inorganic light emitting diode lighting panel, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, and a mirror.

19. An apparatus, comprising:

a vibration member;

a vibration apparatus disposed on the vibration member to vibrate the vibration member, the vibration apparatus including:

a signal cable configured to supply the vibration apparatus with a vibration driving signal from a sound processing circuit; and a fixing member;

a supporting member disposed on the vibration apparatus, the supporting member including a first surface facing the vibration member and a second surface opposite to the first surface; and a vibration signal cable disposed on the supporting member, wherein the vibration apparatus includes:

a vibration device; and a first power supply line and a second power supply line contacting the signal cable.

20. The apparatus of claim 19, wherein the fixing member includes:

a supporting portion configured to support the signal cable and the vibration signal cable;

a wing portion preventing movement of the signal cable and the vibration signal cable; and a pillar portion connecting the supporting portion to the wing portion.

21. The apparatus of claim 20, wherein the signal cable and the vibration signal cable are disposed between the wing portion and the supporting portion of the fixing member.

22. The apparatus of claim 20, wherein the first power supply line and the second power supply line extend along a length of the vibration device.

* * * * *